(12) United States Patent
Ousley

(10) Patent No.: US 9,022,439 B2
(45) Date of Patent: May 5, 2015

(54) SECURITY COVER FOR A UTILITY GROUND BOX AND METHOD

(71) Applicant: Richard L. Ousley, Las Vegas, NV (US)

(72) Inventor: Richard L. Ousley, Las Vegas, NV (US)

( * ) Notice: Subject to any disclaimer, the term of this patent is extended or adjusted under 35 U.S.C. 154(b) by 420 days.

(21) Appl. No.: 13/628,114

(22) Filed: Sep. 27, 2012

(65) Prior Publication Data

US 2014/0083146 A1 Mar. 27, 2014

(51) Int. Cl.

| | | |
|---|---|---|
| *E05B 17/00* | (2006.01) | |
| *E02D 29/14* | (2006.01) | |
| *B23P 11/00* | (2006.01) | |
| *H02G 9/10* | (2006.01) | |
| *B65D 88/76* | (2006.01) | |
| *H02G 3/04* | (2006.01) | |

(52) U.S. Cl.
CPC ............ *E02D 29/1427* (2013.01); *B23P 11/00* (2013.01); *Y10T 29/49963* (2015.01); *Y10T 29/49826* (2015.01); *H02G 3/0493* (2013.01); *H02G 9/10* (2013.01); *H02G 2200/10* (2013.01)

(58) Field of Classification Search
CPC ....... E05D 9/12; E05D 29/14; E05D 29/1427; H20G 9/10; B65D 88/46; B65D 90/105; B65D 90/10
USPC .............. 292/85, 148, 205, 251, 256, 256.71, 292/251.73, 291, 301, 337, 346, DIG. 10, 292/DIG. 11; 220/484, 315, 323; 174/45 R, 174/50
See application file for complete search history.

(56) References Cited

U.S. PATENT DOCUMENTS

| | | | |
|---|---|---|---|
| 135,396 A | | 2/1873 | Bishop |
| 291,771 A | | 1/1884 | Rasgorshek |
| 416,433 A | | 12/1889 | Wilson |
| 962,887 A | * | 6/1910 | Bolger .................. 220/87.2 |
| 1,344,456 A | | 6/1920 | Schroeder |
| 1,670,442 A | | 5/1928 | Fetter |
| 1,943,482 A | | 1/1934 | Madro |
| 2,075,495 A | | 3/1937 | Aten |
| 2,566,870 A | | 9/1951 | Emanuel |
| 2,693,100 A | * | 11/1954 | Wiegel ..................... 70/168 |
| 4,030,851 A | * | 6/1977 | Graybeal .................. 404/25 |
| 4,103,948 A | * | 8/1978 | Naka ........................ 292/256 |
| 4,914,258 A | | 4/1990 | Jackson |
| 5,092,143 A | | 3/1992 | Rumbles |
| 5,197,307 A | * | 3/1993 | Abbott, Jr. ................. 70/164 |
| 5,324,135 A | * | 6/1994 | Smith ........................ 404/25 |
| 5,328,291 A | | 7/1994 | Wisniewski |

(Continued)

FOREIGN PATENT DOCUMENTS

| | | | |
|---|---|---|---|
| CA | 2452823 A1 | * | 6/2005 |
| DE | 2551815 | * | 5/1977 |

(Continued)

*Primary Examiner* — Carlos Lugo
(74) *Attorney, Agent, or Firm* — Dan Brown Law Office; Daniel R. Brown

(57) ABSTRACT

A locking security cover for an in a ground junction box that opens to the earth. A has an opening for access to the interior of the ground box and a lock receiver fixed thereto. Plural legs support the frame and a base flange engages the bottom of the ground box side walls. The leg mounts are selectively engaged to either a flexible connection suitable for insertion of the frame and the first leg into the ground box as a unit, and a fixed connection. A rigid cover engages the frame and provides a lock recess and lock shroud. A lock inserted into the lock shroud engages a lock receiver fixed to the frame.

18 Claims, 21 Drawing Sheets

(56) References Cited

U.S. PATENT DOCUMENTS

| | | | |
|---|---|---|---|
| 5,524,411 | A | 6/1996 | Crossman |
| 5,641,939 | A | 6/1997 | Tourigny |
| 5,806,351 | A | 9/1998 | Learnahan |
| 6,089,396 | A | 7/2000 | Pozek |
| 6,204,446 | B1 | 3/2001 | Parduhn |
| 6,303,863 | B1 | 10/2001 | Raasch |
| 6,488,440 | B1 | 12/2002 | Hill |
| 6,772,613 | B2 | 8/2004 | Webb et al. |
| 6,848,226 | B1 * | 2/2005 | Boyd et al. .................. 52/220.8 |
| 7,144,189 | B1 * | 12/2006 | Bongiovanni et al. ......... 404/25 |
| 7,560,642 | B2 | 7/2009 | Ygnelzi et al. |
| 8,302,796 | B1 * | 11/2012 | Johnson ........................ 220/3.9 |
| 8,714,867 | B1 * | 5/2014 | Vrondran et al. ............... 404/25 |
| 2003/0206770 | A1 * | 11/2003 | Schrage .......................... 404/26 |
| 2009/0200056 | A1 * | 8/2009 | Moran ............................ 174/50 |
| 2014/0138387 | A1 * | 5/2014 | Dang ............................ 220/484 |

FOREIGN PATENT DOCUMENTS

| | | | |
|---|---|---|---|
| DE | 9317326 | * | 1/1994 |
| EP | 0248427 | * | 12/1987 |
| FR | 1070932 | * | 8/1954 |
| FR | 2453241 | * | 1/1980 |
| WO | WO 2013172720 | * | 11/2013 |

* cited by examiner

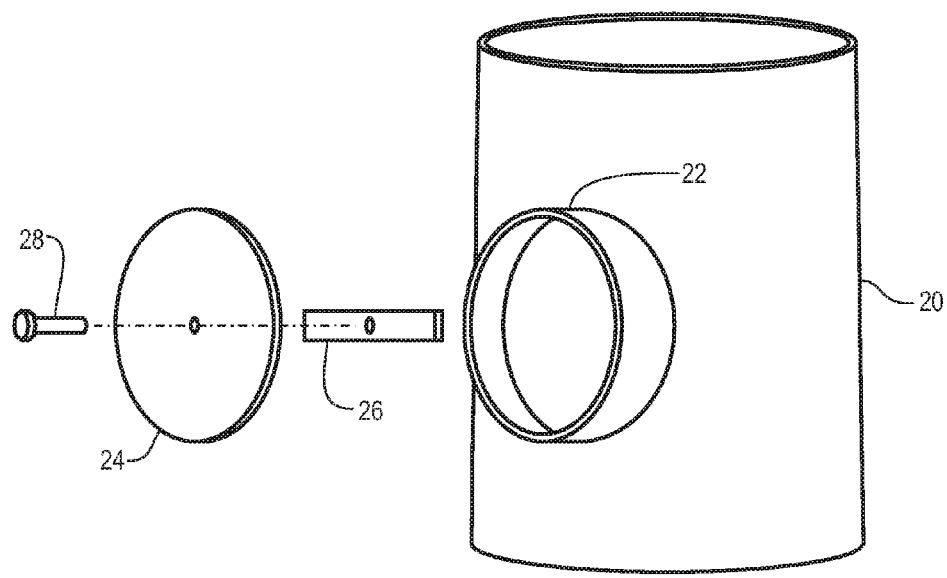
Fig. 2
(Prior Art)
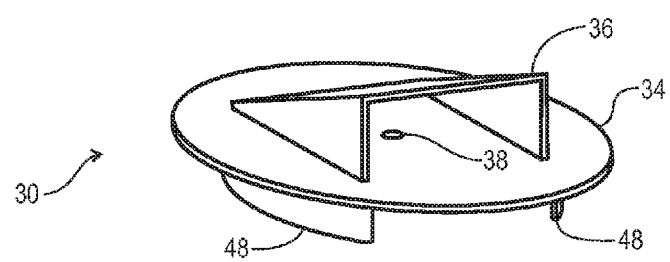
Fig. 3
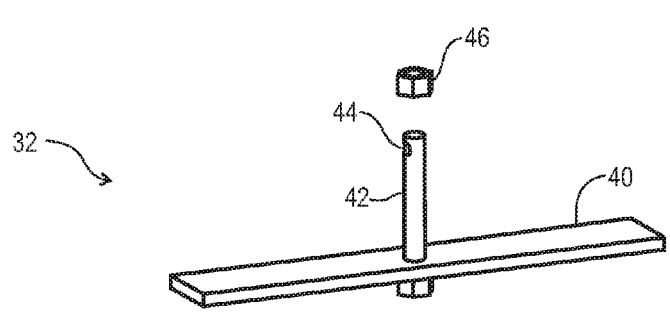

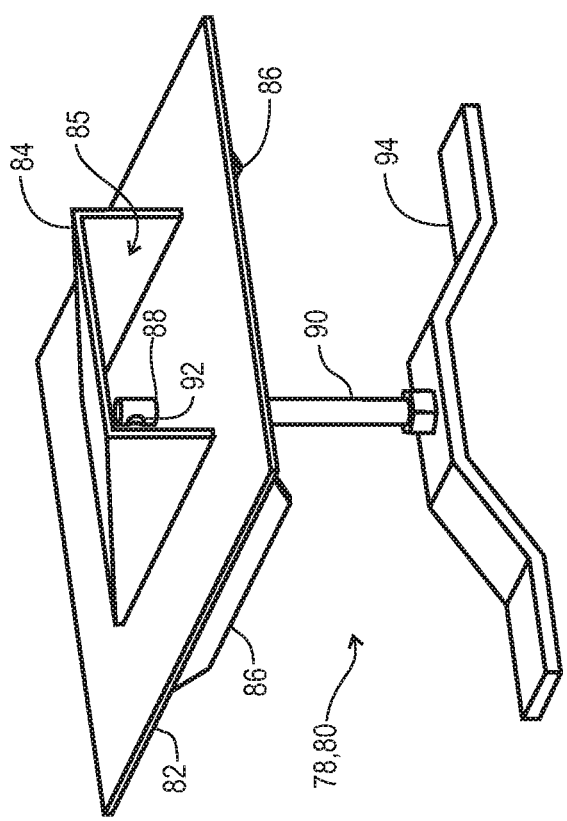
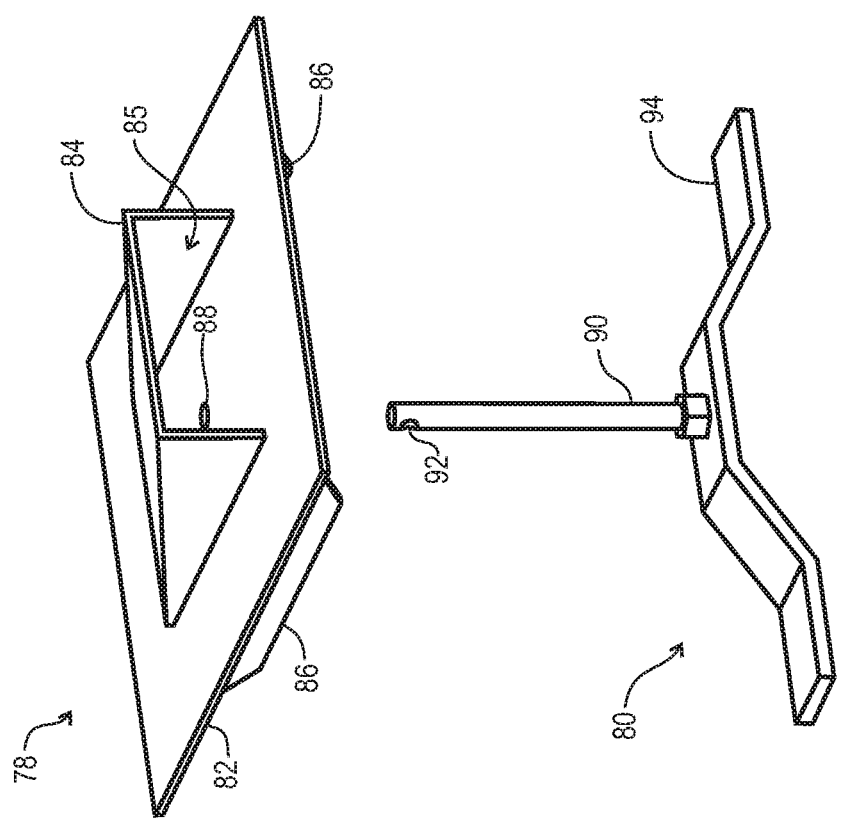

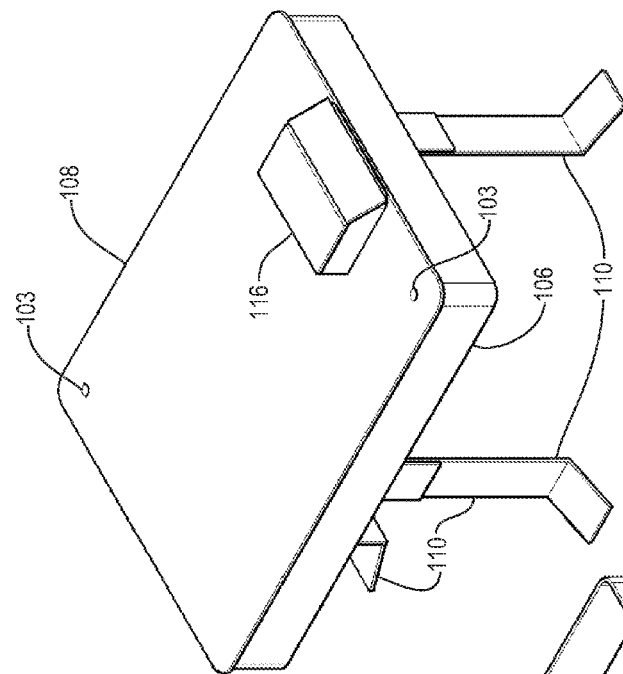
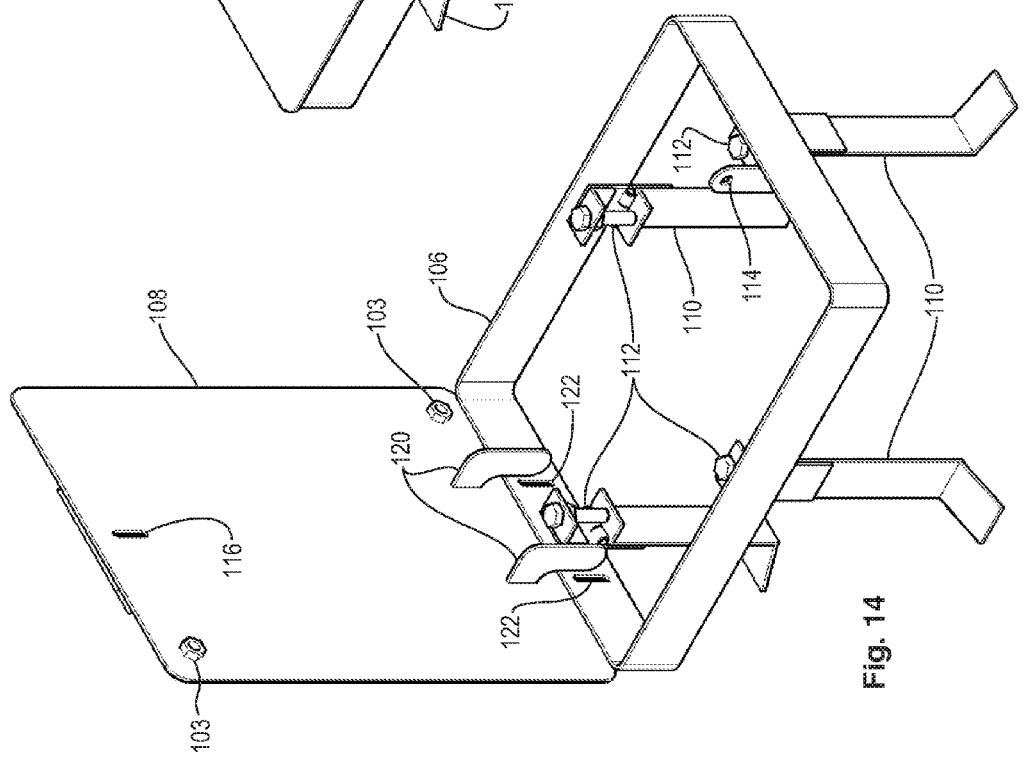

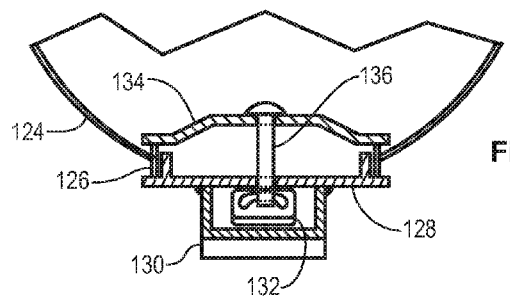
Fig. 16-A
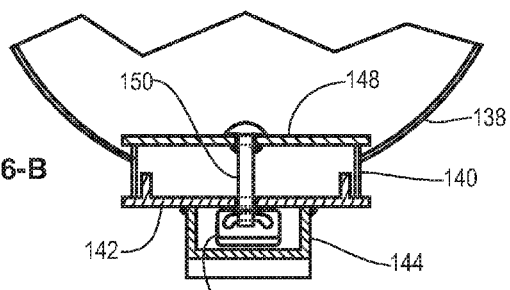
Fig. 16-B
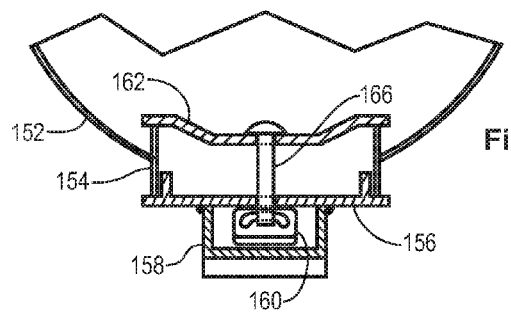
Fig. 16-C
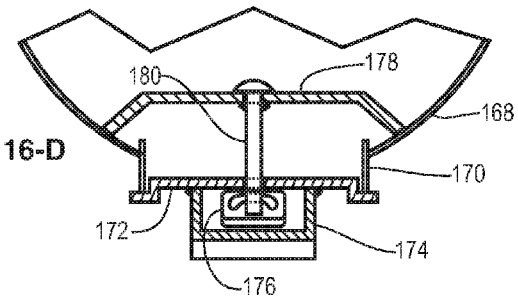
Fig. 16-D
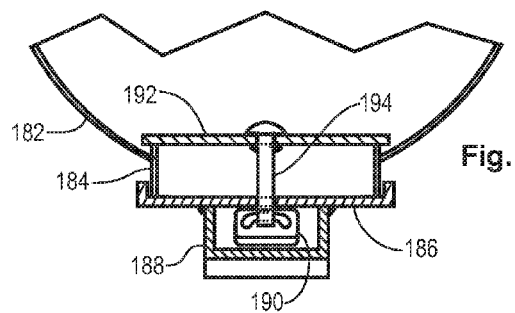
Fig. 16-E

SECURITY COVER FOR A UTILITY GROUND BOX AND METHOD

RELATED APPLICATIONS

This application is a continuation-in-part of U.S. patent application Ser. No. 12/005,825 filed on Dec. 28, 2007, which is a continuation-in-part of U.S. patent application Ser. No. 11/888,102 filed on Jul. 31, 2007, now U.S. Pat. No. 7,884,283 issued on Feb. 8, 2011.

BACKGROUND OF THE INVENTION

1. Field of the Invention

The present invention relates to security covers for enclosures. More specifically, the present invention relates to security covers used to protect the electrical wiring in utility poles and electrical junction boxes.

2. Description of the Related Art

Utility poles are in use throughout the world for area lighting, street lighting, sports complex lighting, security cameras, traffic control and monitoring applications, overhead wiring support, wind turbines, radio antenna support, weather instruments, and many other applications. Utility poles are frequently used as a conduit for electrical wiring and cables from ground level to overhead fixtures or various sorts. Electrical junction boxes and electrical conduits are commonly used in combination with utility poles, to facilitate the routing and distribution of electrical power and signaling circuits. Since such wiring and cables must be installed and maintained from time to time, utility poles and electrical junction boxes frequently include access openings, hand-holes, man-holes and corresponding covers.

In the past, simple covers with conventional fasteners, such as screws and bolts, have been employed to close the access openings during normal use. Technicians and service personal would simply remove the covers using conventional tools when installation or service operations were required. A serious problem has arisen in recent years. Due to increasing value of scrape metals, copper in particular, and the unrestrained desire by certain segments of society to acquire cash from the sales of scrap metals, there has been a explosion in the frequency of theft of copper wiring from utility poles and related junction boxes and conduits. This occurs both during the construction phase and operational phase of a system's life. The modus of operandi of such thieves has been to remove one or more access opening covers from utility poles or related junction boxes, and then pull the wiring out of the utility pole, conduits and junction boxes. Of course, such action is ungraceful and frequently causes damage to the wiring, fixtures, and even the poles and junction boxes themselves. In fact, there have been occurrences where wiring has been stolen several times from the same utility pole installation. Thus, it can be appreciated that there is a need in the art for an apparatus, system and method for selectively securing access openings in utility poles and related electrical junctions boxes.

SUMMARY OF THE INVENTION

The present invention teaches a security cover apparatus, securable using a lock, for an access opening in a ground box that has side walls and a bottom that opens to the earth. The apparatus includes a frame that substantially conforms to the shape of the access opening in the ground box, where the frame has an opening for access to the interior of the ground box, and a lock receiver fixed thereto, as well as a first leg attachment means disposed thereon. The apparatus also includes a first leg for supporting the frame at a position fixed with respect to the access opening, where the leg has a base flange at a lower end for engaging the bottom of the ground box side walls, and also has a frame mount means adapted to engage the leg attachment means. The frame mount means and the leg attachment means can be selectively engaged to either a flexible connection suitable for insertion of the frame and the first leg into the ground box as a unit, and a fixed connection where the frame is fixed in location with respect to the access opening while the base flange engages the bottom of the side walls. The apparatus also includes a rigid cover that substantially cover the frame opening. The rigid cover has a frame engaging member that removeably engages the frame and retains the rigid cover to the frame. The rigid cover has a lock recess formed into it, and also has a lock insertion port though it. The lock recess continues into a lock shroud that aligns with the lock receiver when the rigid cover is disposed on the frame opening. The lock receiver is accessible through the lock shroud while the rigid cover is engaged with the frame, and the lock can be inserted through the lock recess and the lock shroud to engaged the lock receiver so that the lock interferes with movement of the lock shroud to prevent removal of the rigid cover from the frame, and thereby secures the interior of the ground box.

In a specific embodiment, the foregoing apparatus further includes a first leg guide fix to the frame that is aligned to limit lateral movement between the first leg and the frame.

In a specific embodiment of the foregoing apparatus, the lock is a cylinder lock with an outside diameter, and the lock shroud is tubular, having in inside diameter slightly larger than the outside diameter of the lock.

In a specific embodiment of the foregoing apparatus, the leg engagement means is a threaded fastener which engages the rigid frame and the frame mount means is a hole formed through the first leg. In a refinement to this embodiment, the threaded fastener is selected from a bolt that engages a threaded hole in the frame, and a threaded stud welded to the frame that is used in combination with a nut.

In a specific embodiment of the foregoing apparatus, the frame engaging member is an angle iron clip fixed to the rigid cover that engages an edge of the frame opening.

In a specific embodiment, the foregoing apparatus further includes plural legs with corresponding frame mount means, and the frame also comprises plural leg attachment means. In a refinement to this embodiment, the number of the plural leg attachment means exceeds the number of the plural legs, and the mounting locations of the plural legs amongst the plural leg attachment means is optionally selectable to accommodate the interior of the ground box.

In a specific embodiment of the foregoing apparatus, where the ground box includes an exterior lid, the rigid cover further includes an exterior lid fastening means for accessible from the exterior, for engaging at least a first fastener for retaining the exterior lid about the exterior surface of the rigid cover.

The present invention teaches a method of selectively securing, against theft, the contents of a ground box that has an access opening, side walls and a bottom that opens to the earth by using a lock and a security cover apparatus that consists of a frame, plural legs, and a rigid cover. The method consists of the steps of loosely attaching the plural legs to the frame by aligning a frame mount on each of the plural legs with a corresponding leg attachment means on the frame, and then, inserting the frame and plural legs into the ground box through the access opening and positioning the frame with respect to the access opening. Then, inserting a base flange on each of the plural legs under the bottom of the ground box side walls, and, tightening the attachment between the plural leg attachment means and the plural frame mounts, thereby forming a rigid structure between the plural legs and the frame. Next, installing the rigid cover onto a frame opening in the frame by engaging a frame engagement means on the rigid cover with the frame and aligning a lock shroud portion of the rigid cover with a lock receiver fixed to the frame, thereby substantially covering the frame opening, and partially engaging the rigid cover with the frame. Finally, inserting the lock through a lock insertion port on the exterior of the rigid cover and into a lock recess formed into the rigid cover, and advancing the lock into the lock shroud and engaging the lock receiver, thereby positioning the lock to interfere with movement of the lock shroud and preventing removal of the rigid cover from the frame, and thereby securing the interior of the ground box.

In a specific embodiment of the foregoing method, the loosely attaching the plural legs steps further includes engaging the plural legs into plural respective leg guides fixed to the frame, thereby limiting lateral movement between the plural legs and the frame.

In a specific embodiment of the foregoing method, where the lock is a cylinder lock with an outside diameter, the lock shroud is tubular and has an inside diameter slightly larger than the outside diameter of the lock.

In a specific embodiment of the foregoing method, where the leg engagement means is a threaded fastener which engages the rigid frame and the frame mount means is a hole formed through the first leg, the tightening step is accomplished by rotating the threaded fastener. In a refinement to this embodiment, the threaded fastener is selected from a bolt that engages a threaded hole in the frame, and a threaded stud welded to the frame that is used in combination with a nut, and the tightening step may be accomplished by rotating the nut.

In a specific embodiment of the foregoing method, where the frame engaging member is an angle iron clip fixed to the rigid cover, the installing the rigid cover step further includes engaging the angle iron clip with an edge of the frame opening.

In a specific embodiment of the foregoing method, where the number of plural leg attachment means exceeds the number of the plural legs, the method further includes selecting a subset of the plural leg attachment means to accommodate the interior of the ground box.

In a specific embodiment of the foregoing method, where ground box includes an exterior lid, the method further includes placing the exterior lid on the ground box, and engaging at least a first fastener between the exterior lid and an exterior lid fastening means disposed on the rigid cover, thereby securing the exterior lid in place. In another specific embodiment, the foregoing method further includes attaching a weather cover to the lock insertion port.

BRIEF DESCRIPTION OF THE DRAWINGS

FIG. 2 is a drawing of a prior art access opening and cover.
FIG. 3 is a drawing of a security cover apparatus according to an illustrative embodiment of the present invention.
FIG. 8 is a drawing of a security cover apparatus according to an illustrative embodiment of the present invention.
FIG. 9 is a drawing of a security cover apparatus according to an illustrative embodiment of the present invention.
FIG. 14 is a drawing of a security cover apparatus according to an illustrative embodiment of the present invention.
FIG. 15 is a drawing of a security cover apparatus according to an illustrative embodiment of the present invention.
FIGS. 16A-E are section view drawings of a security cover apparatus installed on utility poles according to an illustrative embodiments of the present invention.

DESCRIPTION OF THE INVENTION

Figure 1:
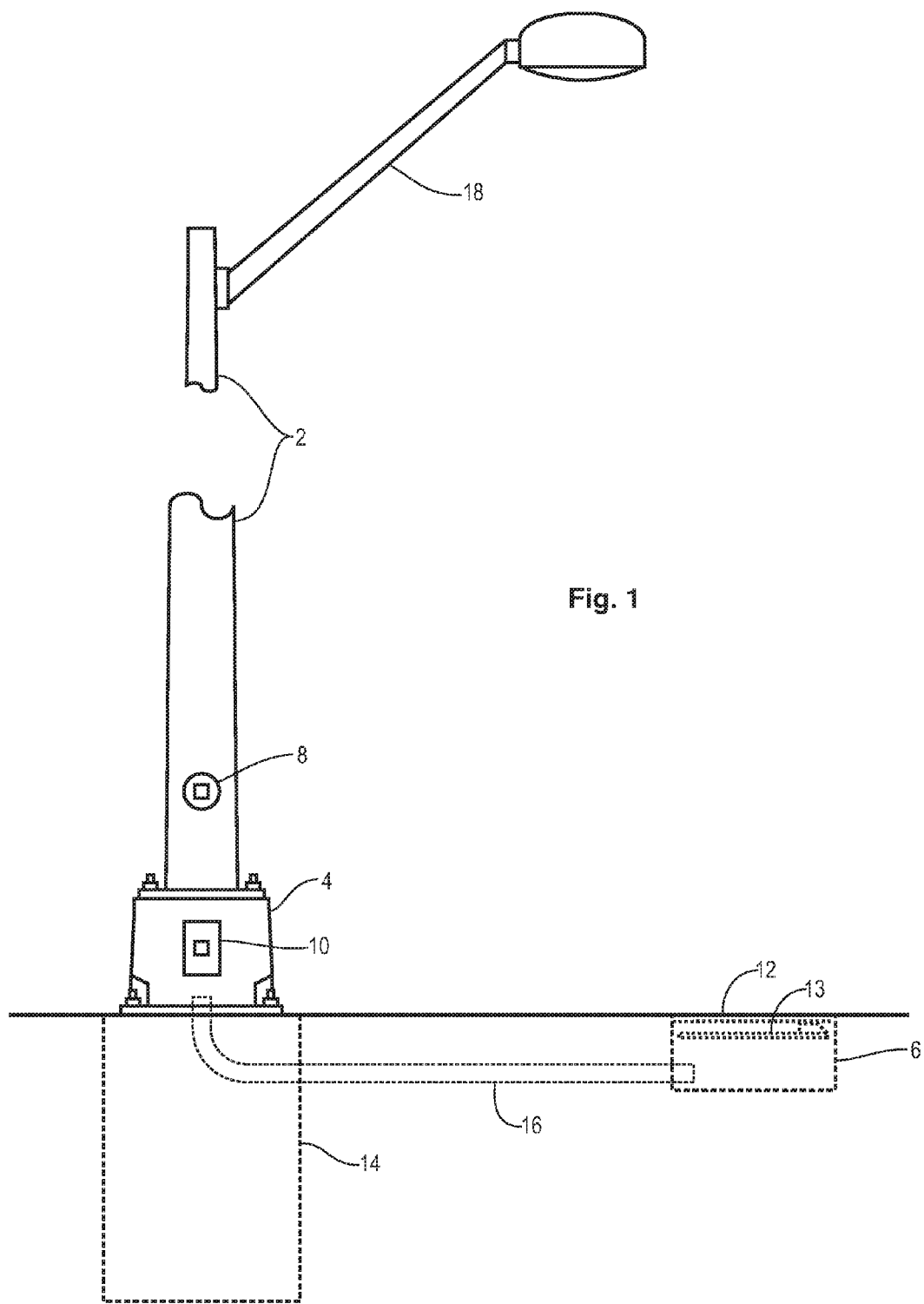
FIG. 1 is a system diagram according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods and components to form various apparatus. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The present invention addresses the problem in the art with teachings directed to a novel access opening cover that is adapted for both new and retrofit installations on a variety of utility poles, utility pole transformer bases, junction boxes, electrical assemblies, and enclosures of other sorts. In the case of a retrofit installation, the originally supplied cover is removed, revealing an access opening. Some openings are cut-outs in the exterior surface of an enclosure, while some are framed and raised away from the surface of the host enclosure. The openings may, or may not, be flanged. The present invention addresses all types. A rigid security cover, which may be fabricated from thick steel plate or other strong material, replaced the original cover. The rigid security cover is configured with strong alignment flanges that extend into the interior or about the exterior of the host opening and engage the host opening so as to maintain a strong alignment therewith. A lock-bar extends from the interior of the enclosure through a lock-bark opening in the rigid security cover. The lock-bar has a padlock shackle hole, such that attachment of a padlock holds the rigid security cover in place on the host opening. With this arrangement, a thief will be frustrated from prying or forcing the rigid security cover away from the opening it protects. With respect to the vulnerability of the lock and shackle, which can be defeated with bolt cutters or a hacksaw, the teachings of the present invention offer further protections. A lock shroud is rigidly attached to the exterior of the rigid security cover, such as by welding, riveting, or other suitable means, which prevents access to the padlock using such tools. An access port is provided in the lock shroud, which is sized to provide just enough access to insert the padlock, engage the shackle through the lock-bar shackle hole, and lock, or unlock, the padlock. Several different means and apparatus are contemplated for securing the lock-bar to the interior of the host enclosure. In the case of an electrical junction box, the original cover may be reattached to the exterior side of the security cover using the same or similar fasteners originally provided with the original cover.

Reference is directed to FIG. 1, which is a system diagram according to an illustrative embodiment of the present invention. FIG. 1 illustrates a typical utility pole 2 configured as a street light, with a lamp housing and extension arm 18. A transformer base 4 is illustrated, which are commonly used where a high voltage power distribution system is employed, and a step-down transformer is required at the light pole location. The integral light pole is typically mounted on a concrete foundation 14. Conduits 16 or underground cabling is typically employed to route power or other signaling conductors. The power wiring (not shown) is routed through the conduit 16, the transformer base 4 and the utility pole 2. Access to the internal wiring is facilitated with access openings. In the illustrative embodiment of FIG. 1, a round hand-hole with rigid security cover 8 is shown on the utility pole 2, and a rectangular access opening with rigid security cover 10 is illustrated in the transformer base 4. The hand-hole 8 and access opening 10 are the dominant locations through which a thief would seek access to steal the internal wiring. In addition, a thief may look for other electrical junction points, which is illustrated by example in FIG. 1 as a flush ground junction box 6 in FIG. 1. Although, those skilled in the art will appreciate that a wide variety of junction boxes are known, and would be fully applicable to the teachings of the present invention. FIG. 1 also illustrates a rigid security cover 13 disposed within the ground junction box 6 to secure against access to the electrical wiring in the junction box 6. The original box cover 12 is reattached to the security cover 13, thereby providing a clean and safe surface at the ground level.

Reference is directed to FIG. 2, which is a drawing of a prior art access opening and cover. A section of a utility pole 20 is shown in FIG. 2 with a raised hand-hole 22, and a conventional, light gauge, cover 24. The light gauge cover 24 is flat and is held in place with a threaded fastener 28 and a bar 26 with a threaded hole to engage the fastener 28. The problem with this arrangement is that a thief can use a conventional tool to unscrew the fastener 28. It is known in the art to use a fastener with an unconventional engagement means, such as a torque bit, three sided bit, and so forth. However, a clever thief can overcome this approach, which is then rendered an inconvenience, rather than a true security measure. In addition, the cover 24 can be pried off or hammered out of shape be a thief to enable access.

Reference is directed to FIG. 3, which is a drawing of a security cover apparatus according to an illustrative embodiment of the present invention. The security cover of FIG. 3 is suitable for use with the hand-hole of FIG. 2. The security cover of FIG. 3 comprises two parts, an external cover assembly 30 and an internal bar assembly 32. The external assembly consists of a heavy gauge rigid cover 34 that is sized to substantially cover the host access opening. In the illustrative embodiment, steel is used, but other metals or composite materials are suitable. The thickness of the cover is dependent on the size of the host opening and the degree of protection desired. In various embodiments, 10 gauge steel and one-quarter inch steel are employed. One or more alignment flanges 48 extend from the interior side of the cover plate 34. The flanges 48 serve to strengthen the cover 34 and engage the host access opening so as to positively locate the cover with respect to the opening. This greatly enhances the security cover's resistance to hammering and prying attacks. The cover plate 34 has a lock-bar hole 38 formed in it, which provides a channel for the lock-bar 42 to extend from the interior side to the exterior side of the cover plate 34. A lock shroud 36 provides protection for a padlock on three sides as well as the exterior side of the padlock and shackle area. A single side of the shroud 36 provides an access port for insertion and operation of the padlock (not shown). The bar assembly consists of a clamp-bar 40 and a lock-bar 42, which are rigidly connected together. In the illustrative embodiment, the lock-bar 42 is a ⅝ inch by three inch long bolt that is welded to the clamp-bar 40. In the drawing of FIG. 3, a nut 46 is used to retain the cover 30 on the lock-bar 42 before the padlock (not shown) is attached to the lock hole 44 in the lock-bar 42. Alternatively, the assembly may be fabricated as a single unit. As just noted above, the lock-bar 42 has a shackle hole 44 formed through it, which is presented on the exterior side of the cover plate 34 when the security cover is assembled as a unit. In the illustrative embodiment, the lock-hole end of the lock bar 42 is machined to a one-quarter inch wide flat section before the lock hole 44 is formed therethrough.

Figure 4:
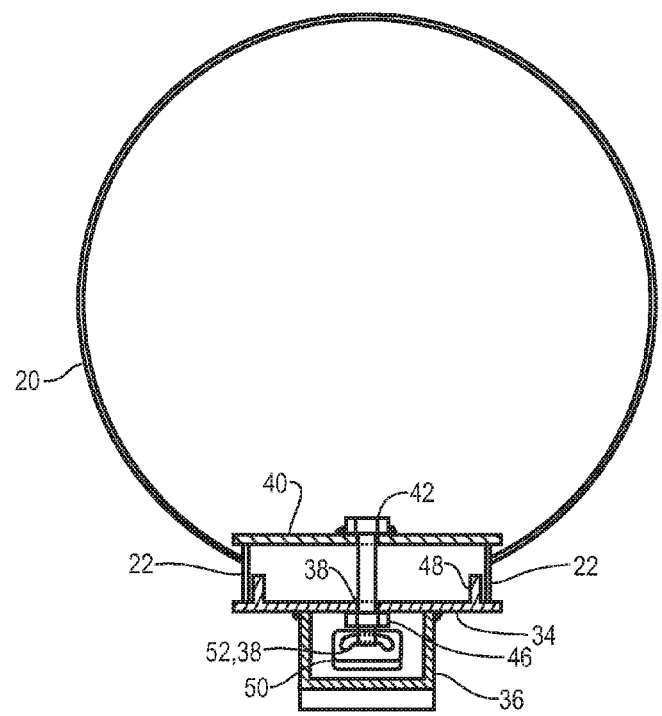
FIG. 4 is a section view drawing of a security cover apparatus installed on a utility pole according to an illustrative embodiment of the present invention.
Figure 5:
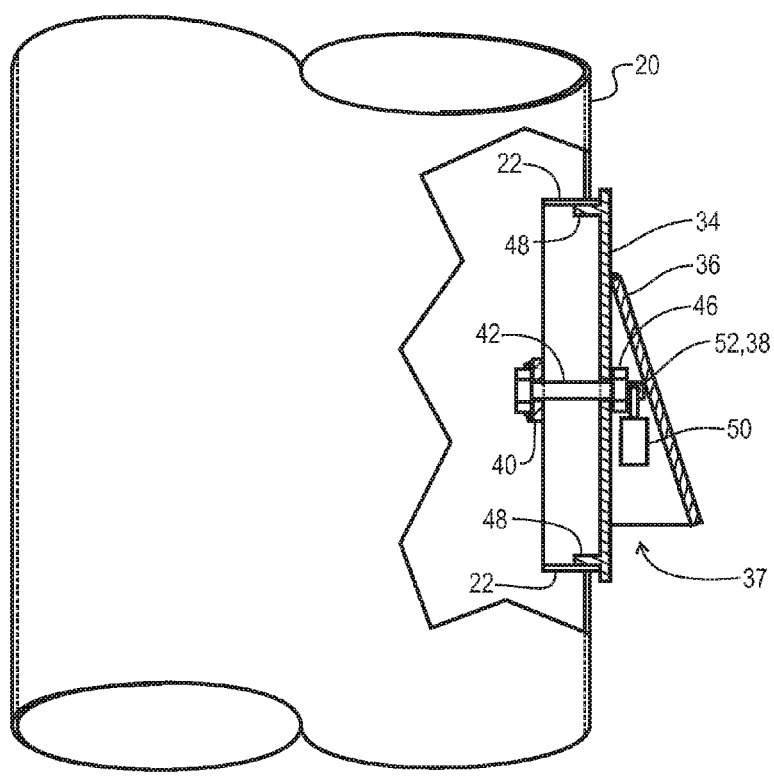
FIG. 5 is a section view drawing of a security cover apparatus installed on a utility pole according to an illustrative embodiment of the present invention.

Reference is directed to FIG. 4 and FIG. 5, which are section view drawings of the security cover apparatus of FIG. 3 installed on the utility pole of FIG. 2, and according to an illustrative embodiment of the present invention. The light pole 20 and hand-hole 22 are illustrated. Note that the hand-hole 22 has sidewalls, which is common in the case where an access opening is provided in a curved surface, such as a round utility pole. The clamp-bar 40 is inserted through the hand-hole 22 with the lock-bar 42 extending to the exterior of the utility pole 20. Note that the clamp-bar 40 and lock-bar 42 are rigidly welded together in this example. The lock-bar 42 extends through the lock-bar opening 38 in the cover plate 34, and presents the shackle opening 52 inside of the lock shroud 36. The retaining nut 46 is threaded onto the end of the lock-bar 42, and is used to urge the cover 34 firmly against the hand-hole frame 22. The padlock 50 is then inserted into the lock shroud 36 through the access port 37, where the padlock 50 shackle 52 is inserted through the shackle hole 38 and locked in place. The cover plate 34 is located with respect to the hand-hole 22 opening with the locating flanges 48 that extend from the interior side of the cover plate 34. This arrangement is highly effective at resisting access to the electrical wiring (not shown) located within the utility pole 20.

Figure 6:
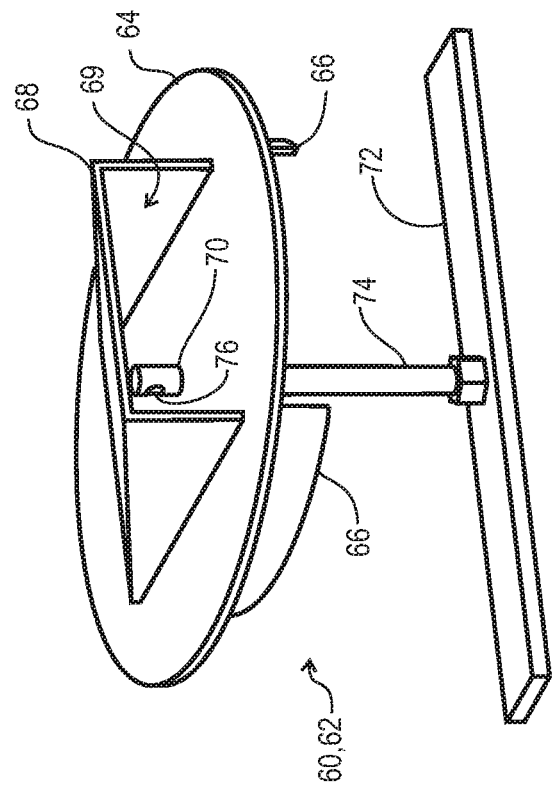
FIG. 6 is a drawing of a security cover apparatus according to an illustrative embodiment of the present invention.
Figure 7:
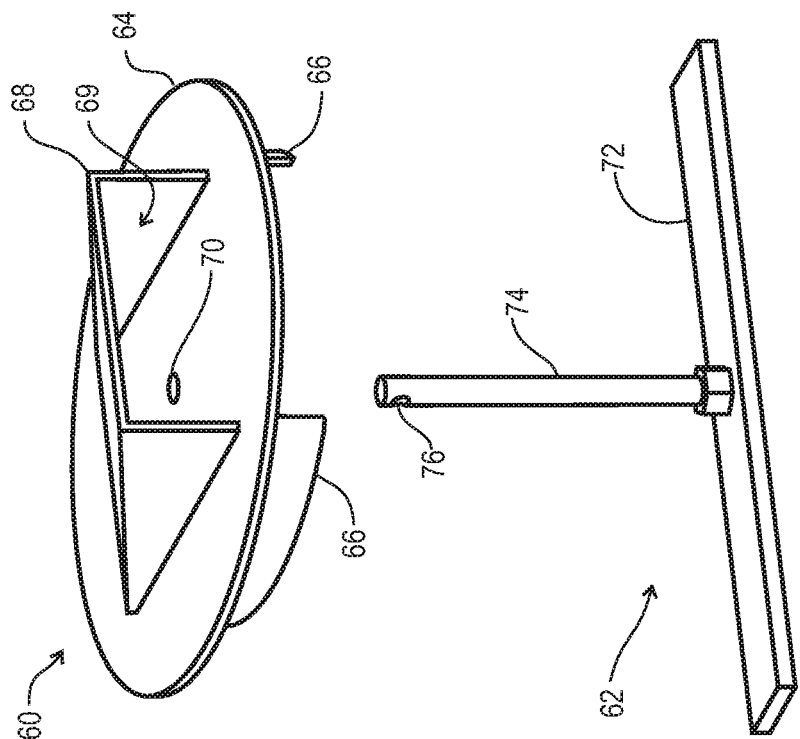
FIG. 7 is a drawing of a security cover apparatus according to an illustrative embodiment of the present invention.

Reference is directed to FIG. 6 and FIG. 7, which are drawings of a security cover apparatus according to an illustrative embodiment of the present invention. These figures illustrate the spatial arrangement of the cover assembly 60 and the back assembly 62. The cover assembly consists of the heavy gauge rigid cover plate 64, which has the alignment flanges 66 extending from the interior side of the cover plate 64. In the illustrative embodiment, a round cover plate is illustrated. Those skilled in the art will appreciate that specific shape of the cover is determined by the shape of the host opening that the cover is designed to protect. For example, round, oval, elliptical, and other accurate shapes are known to be used in access openings. The lock shroud 68 is welded to the exterior side of the cover plate 64. Note that in the illustrative embodiment, the lock shroud 68 is a triangular wedge fabricated from heavy gauge steel, and with an access port opening 69 on its lower side. Those skilled in the art will appreciated that other geometric shapes can readily be employed as the lock shroud. The essential aspects of the shroud are to provide limited access to the shackle area of the lock, while providing just enough access to insert and lock the padlock. The back assembly 62 consists of a clamp-bar 72, which has a length sufficient to engage an internal surface of the host enclosure or utility pole. A lock-bar 74 is rigidly connected to the clamp-bar 72 in the illustrative embodiment. A steel rod is used as the lock-bar 74 in the illustrative embodiment. A shackle hole 76 is formed through the lock-bar 74 to facilitate connection of the padlock shackle. Note that the length of the lock-bar 74 is selected to position the shackle opening 76 between the exterior surface of the cover plate 64 and within the lock shroud 68 while the cover assembly is engaged through the lock-bar hole 70 with the host enclosure or utility pole.

Reference is directed to FIG. 8 and FIG. 9, which are drawings of a security cover apparatus according to an illustrative embodiment of the present invention. These figures illustrate the spatial arrangement of the cover assembly 78 and the back assembly 80. The cover assembly 78 consists of the heavy gauge rigid cover plate 82, which has the alignment flanges 86 extending from the interior side of the cover plate 82. In the illustrative embodiment, a square cover plate is illustrated. Those skilled in the art will appreciate that specific shape of the cover is determined by the shape of the host opening that the cover is intended to protect. For example, square, rectangular, elongated, and other shapes are known to be used in access openings. The lock shroud 84 is welded to the exterior side of the cover plate 82. Note that in the illustrative embodiment, the lock shroud 84 is a triangular wedge fabricated from heavy gauge steel, and with an access port opening 85 on the lower side. Those skilled in the art will appreciated that other geometric shapes can readily be employed as the lock shroud. The essential aspects of the shroud are to provide limited access to the shackle area of the lock, while providing just enough access to insert and lock the padlock. The bar assembly 80 consists of a clamp-bar 94, which has a length sufficient to engage an internal surface of the host enclosure or utility pole. Note that the clamp-bar 94 may be inwardly or outwardly offset so as to conform to the internal configuration of the host enclosure or utility pole. A lock-bar 90 is rigidly connected to the clamp-bar 94 in the illustrative embodiment. A steel rod is used as the lock-bar 90 in the illustrative embodiment. A shackle hole 92 is formed through the lock-bar 90 to facilitate connection of the padlock shackle. Note that the length of the lock-bar 90 is selected to position the shackle opening 92 between the exterior surface of the cover plate 64 and within the lock shroud 68 while the cover assembly is engaged through the lock-bar hole 88 with the host enclosure or utility pole.

Figure 10:
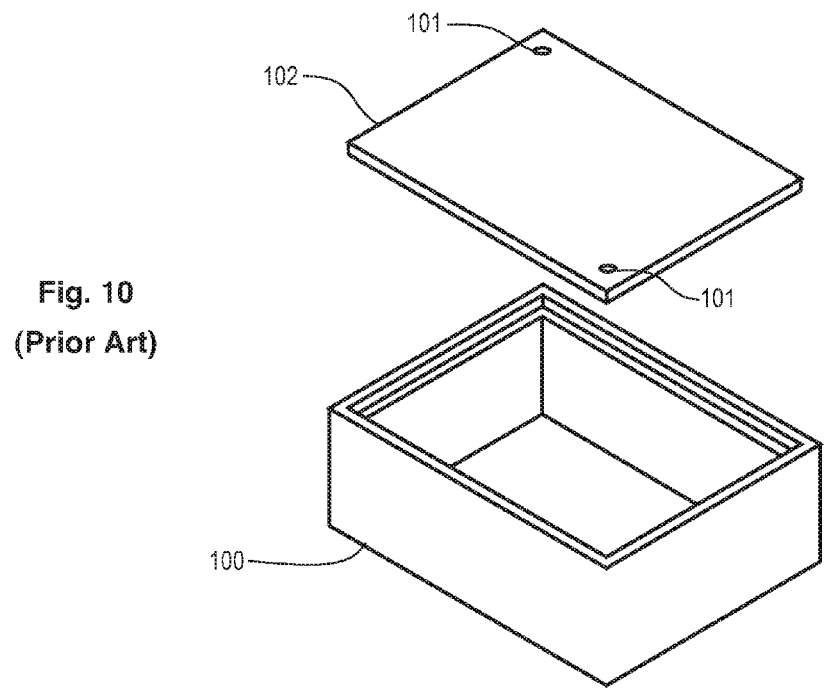
FIG. 10 is a drawing of a prior art electrical junction box.

Reference is directed to FIG. 10, which is a drawing of a prior art electrical junction box. The junction box 100 of FIG. 10 is typical for an in-ground, grade level electrical junction box used in conjunction with utility pole installations. Typically, there will be plural utility poles with subterranean conduits routed through plural ground-level junction boxes, which facilitate installation, service, and routing of power distribution and signaling wiring. The prior art covers 102 are typically secured with conventional fasteners (not shown) using cover holes 101 that engage an internal fastening means (not shown) in the junction box 100, such as threaded holes of threaded brackets. A thief can readily remove the conventional fasteners using conventional tools, thereby exposing the internal wiring to theft.

Figure 11:
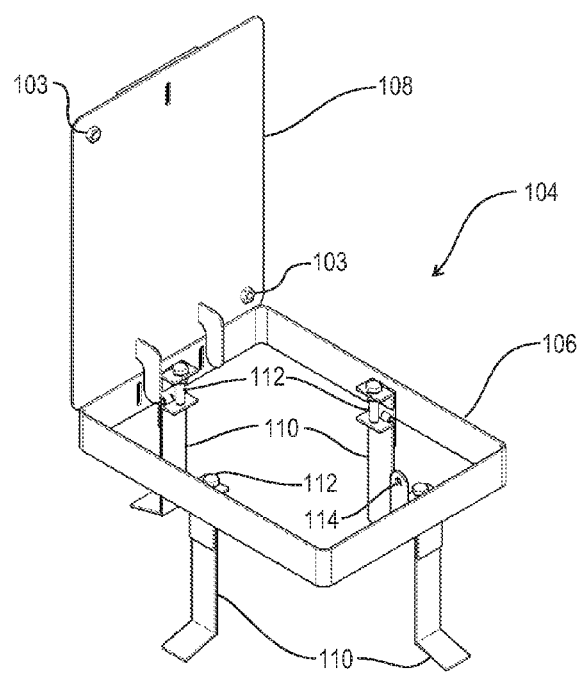
FIG. 11 is a drawing of a security cover apparatus according to an illustrative embodiment of the present invention.

Reference is directed to FIG. 11, which is a drawing of a security cover apparatus 104 according to an illustrative embodiment of the present invention. The security cover 104 of FIG. 11 is generally adapted to accommodate the ground junction box 100 of FIG. 10. The cover assembly 104 of FIG. 11 consists of a rigid steel frame 106 that is configured to fit the opening of the host junction box. Plural engaging arms 110 extend into the junction box and act as engaging members to hold the frame 106 in place within the opening of the host junction box. Each engaging arm has a corresponding urging means 112, which is a threaded bolt in the illustrative embodiment. During installation, the threaded bolts 112 are tightened to force the engaging arms against the internal surfaces of the host junction box or to reach to the bottom edge of the box in the case of an open bottom ground level junction box, thereby retaining the frame 106 within the junction box opening. A lock-bar 114 with a shackle hole extends upwardly from the exterior side of the frame 106. The rigid steel cover 108 is placed over the frame, and is secured in place by the lock-bar, which is more fully described hereinafter. Plural fastening means 103, such as nuts welding to the cover 108, are aligned to engage the originally supplied cover's fasteners. This arrangement allows the original cover 102 to be positioned over the security cover 108, thereby concealing it and presenting a smooth and safe ground surface.

Figure 12:
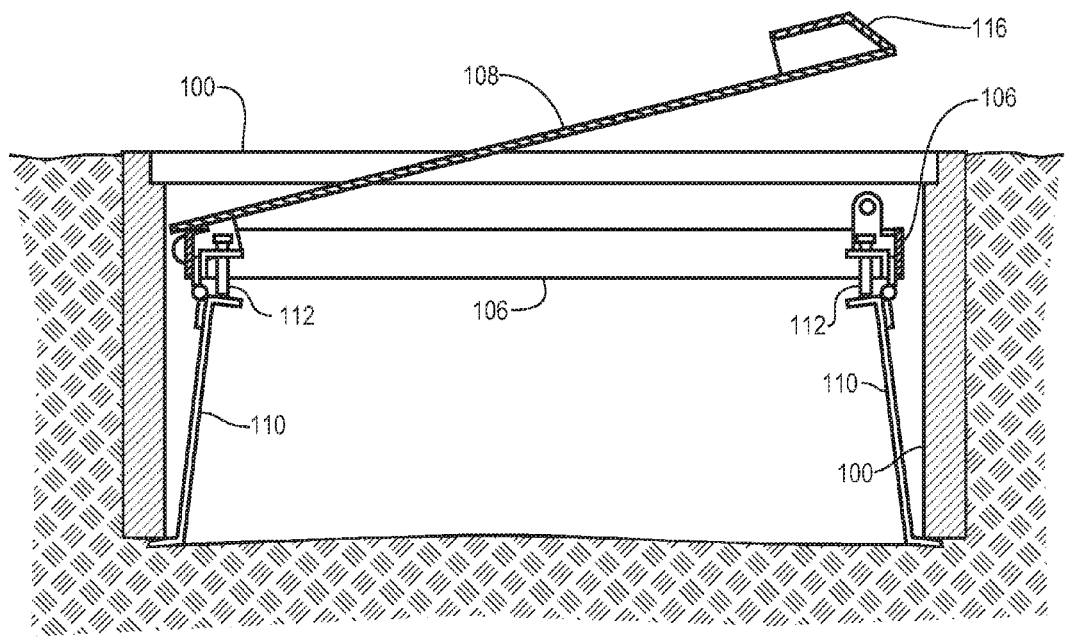
FIG. 12 is a section view drawing of a security cover apparatus installed on an electrical junction box according to an illustrative embodiment of the present invention.
Figure 13:
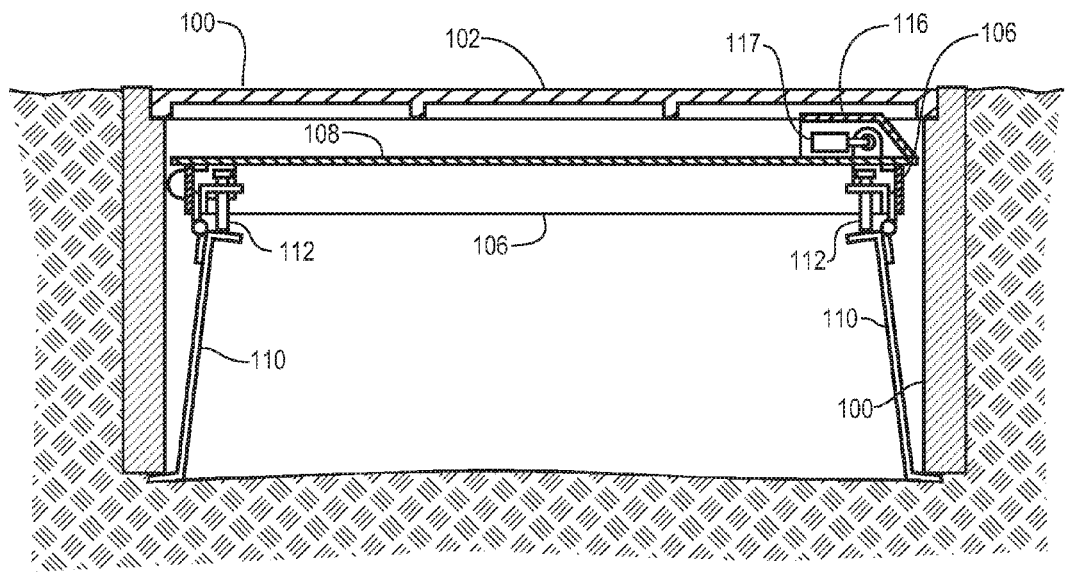
FIG. 13 is a section view drawing of a security cover apparatus installed on an electrical junction box according to an illustrative embodiment of the present invention.

Reference is directed to FIG. 12 and FIG. 13, which are a section view drawings of a security cover apparatus installed on a ground level electrical junction box after subterranean installation 100 according to the illustrative embodiment of the present invention. FIG. 12 illustrated the security cover 108 partially open with the original cover removed, and FIG. 13 illustrates the security cover fully closed with the original cover 102 in place. Note that the junction box 100 has an open bottom, which is typical in such boxes, and that there is a flanged opening on the top, which provides support for the originally supplied cover 102. The frame 106 of the cover assembly is shaped to rest within the opening flange of the host enclosure 100. The size and shape of the illustrative embodiment frame 106 and cover 108 are dependant upon the size and shape of the host junction box 100. In the illustrative embodiment, it is rectangular. Plural engaging arms 110 are flexibly coupled to the frame 106 with hinges in the illustrative embodiment. Plural corresponding threaded bolts 112 are rotated to force downwardly upon the upper flange of the engaging arms 110, which causes each arm to rotate about its hinge. This rotation urges the lower portion of each arm outwardly until the lower flange of each engaging member 110 is forced against the interior surface of the junction box 100. The length and shape of the engaging arms is designed to conform to the junction box. In the illustrative embodiment, the arms 110 are long enough to rest on the soil at the bottom of the enclosure, and are urged into the earth at the bottom edge of the junction box 100 side walls. Having secured the frame 106 on the junction box 100, the cover 108 can be placed into position and secured.

The cover 108 in FIG. 12 and FIG. 13 is secured to the frame 106 using one or more lock-bars 114 which extend upwardly to the exterior of the frame 106. A lock-bar hole (not shown) in the cover 108 engages the lock-bar 114 within a lock shroud 116 on the exterior of the cover 108. The lock shroud 116 protects a padlock while providing just enough access to insert and lock the padlock in place, as was described hereinbefore. In the illustrative embodiment, a single lock-bar 114 is used in combination with plural cover tangs (discussed hereinafter) to hold the cover 108 in position on the frame 106. It will be appreciated that the cover could also be secured with plural lock-bars and plural lock shrouds using plural padlocks, with the cover tangs being omitted entirely.

Reference is directed to FIG. 14 and FIG. 15, which are drawings of the security cover apparatus according to an illustrative embodiment of the present invention. FIG. 14 illustrates the cover 108 fully open and FIG. 15 illustrated the cover fully closed. The frame 106 is formed to accommodate the shape of the host enclosure opening. Four engaging arms 110 extend downwardly from the interior side of the frame 106, and each has a lower flange extending outwardly to engage the interior of the host junction box. Each engaging arm is attached by a hinge and threaded bolt assembly 112. When the bolts are tightened, they force downwardly in the upper flange of the engaging arms, which rotates the arms about the hinge assemblies 112. Once the frame is securely attached to the host junction box or enclosure, the cover 108 is secured into position, thereby preventing further access to the bolt and hinge assemblies 112. The cover 108 is held in position using a pair of cover tangs 120 that engage corresponding tang slots 122 in the frame 106. The tangs 120 are inserted into the slots 122, and the cover is then rotated downwardly so that the lock-bar slot 166 engages the lock-bar 114. The lock-bar 114 has a shackle hole formed therein, which is presented within the lock shroud 116. The padlock is inserted through an access port (not visible in this perspective) for securely locking the cover 108 in place.

Reference is directed to FIG. 16A-D, which are section view drawings of a security cover apparatus installed on utility poles according to several illustrative embodiments of the present invention. FIG. 16-A illustrates a utility pole 124 with a shallow depth framed access opening 126. A clamp-bar 134 and lock bar 136 that are formed to accommodate a shallow depth framed opening are inserted through the opening 126. The cover with alignment flanges 128 is inserted into the framed opening 126, with the lock-bar 136 extending into the lock shroud 130, where the padlock 132 is attached to the end of the lock-bar 132.

FIG. 16-B illustrates a utility pole 138 with a standard depth framed access opening 140. A flat clamp-bar 148 and lock bar 150 that are formed to accommodate a standard depth framed opening are inserted through the opening 140. The cover with alignment flanges 142 is inserted into the framed opening 140, with the lock-bar 150 extending into the lock shroud 144, where the padlock 146 is attached to the end of the lock-bar 150.

FIG. 16-C illustrates a utility pole 152 with a deep depth framed access opening 154. A clamp-bar 162 and lock bar 166 that are formed to accommodate a deep depth framed opening are inserted through the opening 154. The cover with alignment flanges 156 is inserted into the framed opening 154, with the lock-bar 166 extending into the lock shroud 158, where the padlock 160 is attached to the end of the lock-bar 166.

FIG. 16-D illustrates a utility pole 168 with a framed access opening 170. A clamp-bar 178 and lock bar 180 that are formed to engage the interior surface of the utility pole 168 directly, rather than the frame 170, are inserted through the opening 170. The cover having alignment flanges that are stamped into the cover material 156 is inserted into the framed opening 170, with the lock-bar 180 extending into the lock shroud 174, where the padlock 176 is attached to the end of the lock-bar 180.

FIG. 16-E illustrates a utility pole 182 with a framed access opening 184. A clamp-bar 192 and lock bar 194 that are formed to engage the frame 184, and are inserted through the opening 184. The cover 186 having alignment flanges that are formed and sized to engage the exterior of the framed opening 184 is inserted into the framed opening 184, with the lock-bar 194 extending into the lock shroud 188, where the padlock 190 is attached to the end of the lock-bar 194.

Figure 17B:
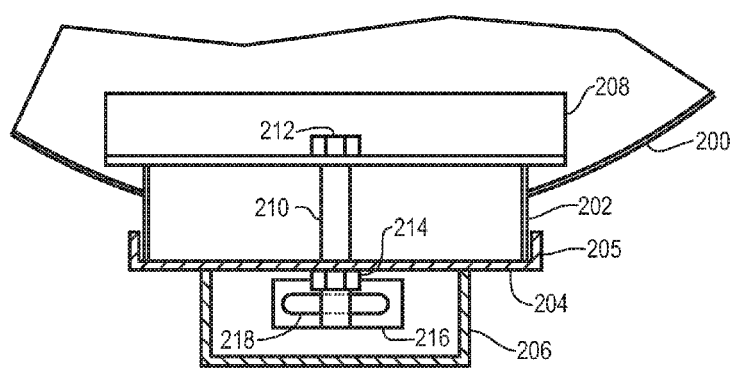
FIGS. 17A-C are front view and section drawings of a hand-hole security cover according to an illustrative embodiment of the present invention.
Figure 17A:
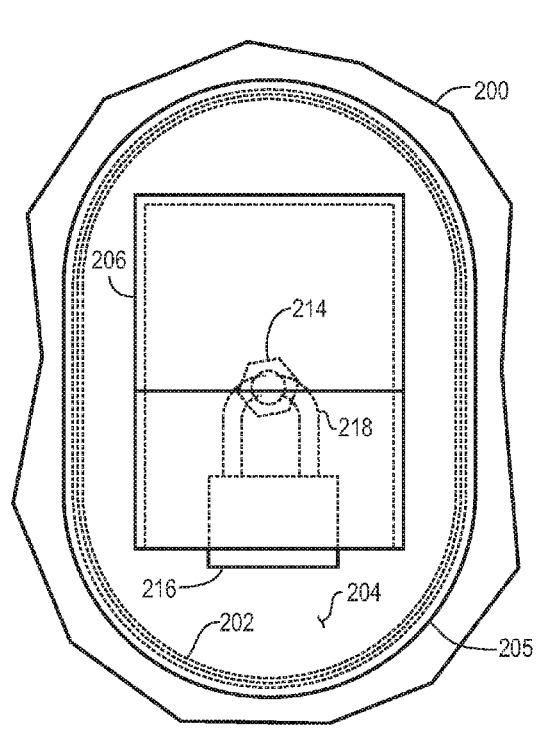
Figure 17C:
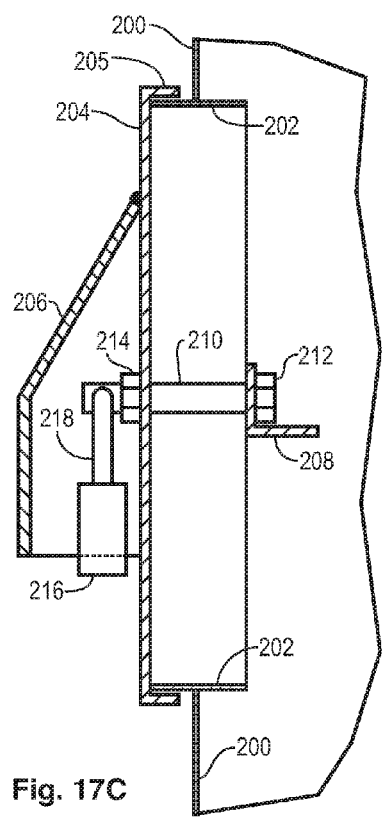

Reference is directed to FIGS. 17A-C, which are front view and section drawings of a hand-hole security cover according to an illustrative embodiment of the present invention. The embodiment in FIG. 17 provides enhanced security against aggressive attacks using pry bars and other leverage tools. FIG. 17A is a front view of the illustrative embodiment security cover installed on a utility pole 200 hand hole 202.

FIG. 17B is a section view looking downward, and FIG. 17C is a section view looking sideways. The utility pole 200 and hand-hole frame 202 host the security cover of the illustrative embodiment. The security cover consists of a rigid cover, which is a steel plate 204 that may range in thickness from about 10 gauge to ⅜" plate. An alignment flange 205 extends from the interior surface of the rigid cover 204, which serves align the cover 204 with the hand-hole frame 202, strengthen the cover 204 by adding depth to its section, and limits access of a prying tool between the cover 204 and the hand-hole frame 202. Note that the flange 205 extends around the entire periphery of the cover 204, thereby protecting it about its entire periphery. The flange 205 is continuously welded to the cover 204 and is fabricated from steel, also ranging in thickness from approximately 10 gauge to ⅜".

A lock recess shrouds the lock 216 and is formed between the cover 204 and a lock shroud 206, which are welded together to form a solid, strong unit. The bottom of the shroud is open to facilitate inserting the lock 216 and engaging the lock's shackle 218 with the lock interface on the lock-bar 210. Note that in the illustrative embodiment a hole is formed in the end of the lock-bar 210 to engage the shackle 218 of the lock 216. Those skilled in the art will appreciate that other types of locks could readily be employed, and that the lock interface of the lock bar would be adapted such that the lock can be securely affixed to the end of the lock bar, thereby preventing removal of the lock 216 and cover 204 from the utility pole 200 hand-hole 202. Similarly, the shroud can be configured in a variety of ways, such as a recess formed in the cover 204, separately connected assemblies, and so forth. The function of the lock recess, or shroud, is to limit access to the lock components and operation in the area where it interfaces with the lock bar, so that it is not accessible to attack with cutting or prying tools. In the illustrative embodiment, the shroud 206 is formed as a tapered portion and a rectangular portion. It can also be fully tapered or fully rectangular, or other suitable shape, as will be appreciated by those skilled in the art. The important aspect is that the lock recess protects the lock interface, as noted above.

Another improvement in the illustrative embodiment of FIGS. 17A-17C is the clamp-bar 208, which is also strengthened against bending. In the event a prying attack is made against the cover 204 and flange 205, the clamp-bar 208 is of sufficient strength to resist the induced bending forces. In the prior illustrative embodiments, a flat bar was employed. In the present embodiment, an angle iron 208 is used. The angle iron is a conventional section, such as a 1"×1"×¼" steel angle, or other suitable section as will be appreciated by those skilled in the art. This type of section provides bending resistance across both axes. The clamp bar 208 is drilled and the lock-bar 210, which is a steel bolt in the illustrative embodiment, is inserted through with the bolt head 212 welded to the clamp-bar 208 to form a single rigid unit. The bolt may range in size from approximately 3/16 inch to ½" or larger. The lock-bar is inserted into the frame 202 and the cover 204 is placed into position. A nut 214 threadably engages the lock-bar 210 to hold the cover 204 in place while the lock 216 is engaged with the lock interface on the exterior end of the lock bar 210.

Figure 18B:
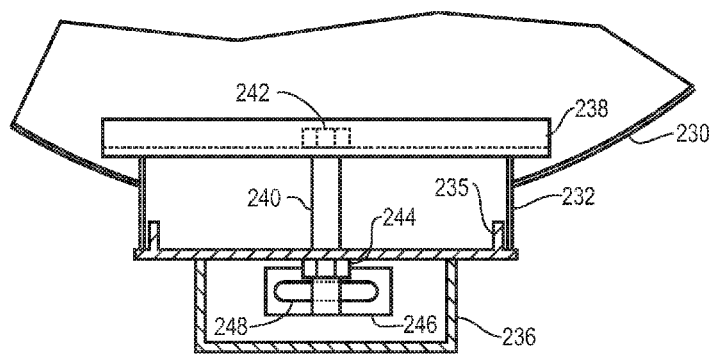
FIGS. 18A-C are front view and section drawings of a hand-hole security cover according to an illustrative embodiment of the present invention.
Figure 18A:
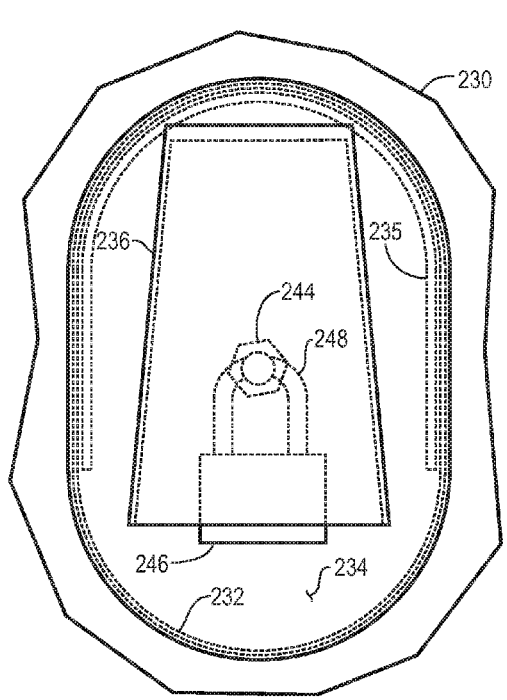
Figure 18C:
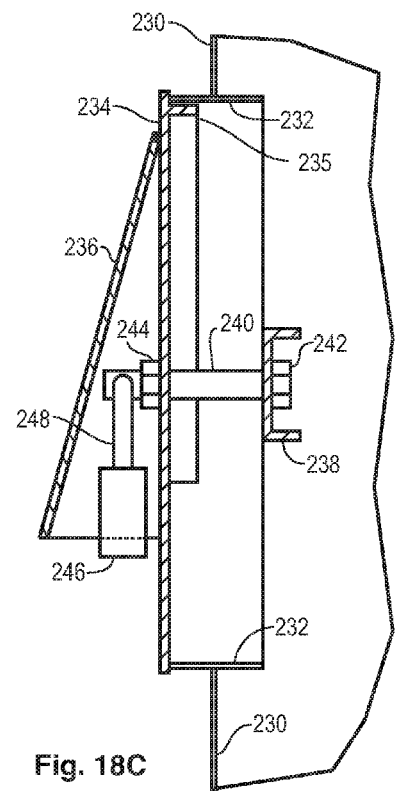

Reference is directed to FIGS. 18A-C, which are front view and section drawings of a hand-hole security cover according to an illustrative embodiment of the present invention. The embodiment in FIG. 18A-C provides enhanced security against aggressive attacks using pry bars and other leverage tools. FIG. 18A is a front view of the illustrative embodiment security cover installed on a utility pole 230 hand hole 232. FIG. 18B is a section view looking downward, and FIG. 18C is a section view looking sideways. The utility pole 230 and hand-hole frame 232 host the security cover of the illustrative embodiment. The embodiment of FIGS. 18A-C is similar to that of FIGS. 17A-C, and illustrates certain refinements to the design. In FIGS. 18A-C, the rigid cover 234 is placed over the hand-hole frame 232 and opening. The alignment and strengthening flange 235 extends from the interior surface of the cover 234. However, the flange 235 is positioned about the interior of the hand-hole frame 232. Also note that the flange 235 extends about the upper and most of the side portions of the periphery of the cover 234, but no the lower sides and bottom. This is useful in the situation where the lower portion of the hand-hole is not accessible for access with a prying tool. This would be the case where the hand-hole is close to the ground or some other structure. The concept at issue is to route the strengthening flange 235 around so much of the periphery of the cover 234 as is reasonably exposed to attack. FIGS. 18A-C also illustrates an alternative shroud 236 configuration, which uses a straight taper from top to bottom to shield the lock 246, shackle 248 and lock-bar 240 and nut 244. The lock-bar 240 is a bolt, and the bolt head 242 is welded to the clamp-bar 238. In this illustrative embodiment, the clamp-bar is a length of channel iron, which provides the aforementioned strength against bending in a prying attack on the cover 234.

Figure 19B:
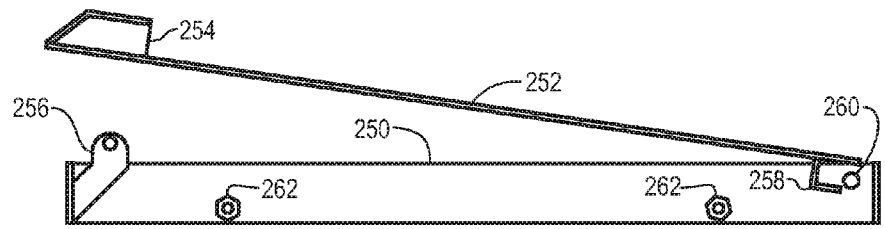
FIGS. 19A-C are section view drawings of a security cover apparatus installed on an electrical junction box according to an illustrative embodiment of the present invention.
Figure 19A:
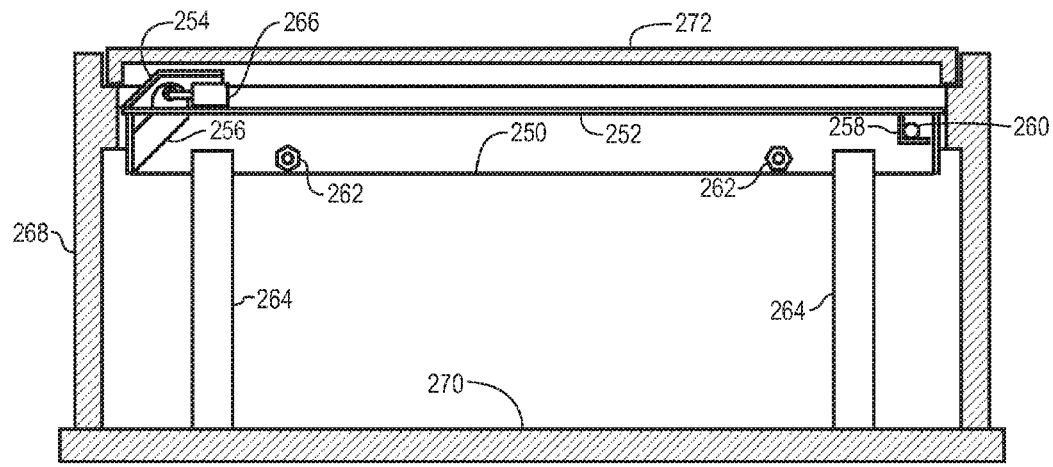
Figure 19C:
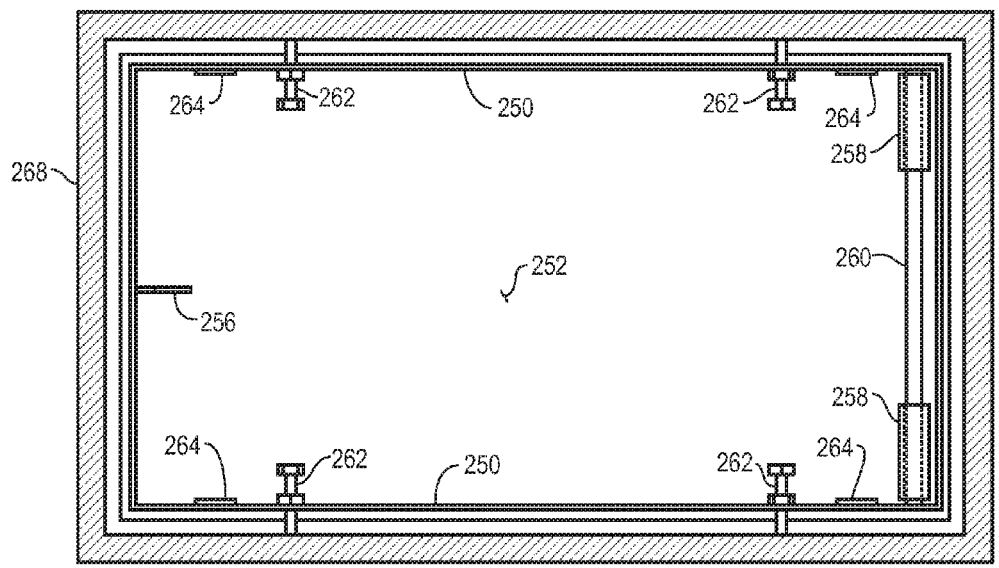

Reference is directed to FIGS. 19A-C, which are section view drawings of a security cover apparatus installed on an electrical junction box according to an illustrative embodiment of the present invention. FIG. 19A is a side-looking cross section that includes the enclosure 268. FIG. 19B is a side-looking cross section of the cover 252 and frame 250, showing the cover 254 partially open. FIG. 19C is an upwardly-looking section view showing the underside of the frame 250 and cover 252. The frame 250 is fabricated from steel and is sized to generally conform to the shape of the access opening in the enclosure 268, which is a ground-mounted concrete junction box in the illustrative embodiment. The frame 250 can be fabricated from mild steel ranging in thickness from approximately 10 ga. to ⅜" plate. The frame 250 is supported above the floor 270 of the enclosure 268 with plural steel support legs, which serve to support the frame vertically near the access opening of the enclosure 268. Plural enclosure engaging member "jack-bolts" 262 are provided to adjustably engage the side walls of the enclosure 268. The jack-bolts may be 1.5" long by 3/16" steel bolts and nuts, for example. During installation, the frame 250 is inserted into the enclosure such that the legs 264 hold it at the desired height. The jack-bolts are then rotated to extend the bolts through the nuts welded in the interior side of the frame 250 so as to engage the interior side walls of the enclosure 268. By cooperatively adjusting the extended length of the plural jack-bolt members 262, the frame can be rigidly and fixedly coupled to the enclosure 268 at a position adjacent to the access opening of the enclosure 268.

The frame 250 has a lock-bar 256 welded to its interior surface that projects upwardly toward the exterior of the enclosure 268 and frame 250. The extended end of the lock-bar 256 has a lock-interface formed therein, which is a shackle hole in the illustrative embodiment. At the other end of the frame 250, there is a steel rod 260 welded from side-to-side, which serves as a cover-engaging member and half of a coupling hinge. The cover 252 is a steel plate sized to cover the frame 250, which also complies with the shape of the access opening in the enclosure 268. The cover may be ⅛" steel plate, for example. Those skilled in the art will appreciate that other thicknesses may be suitable depending on the size of the opening and the desired strength. The underside of the cover as a pair of angle clips 258, which serves as frame engaging members and the other half of a hinge. As can be seen in FIG. 19B, the cover 252 is placed on top of the frame 250, and the frame engaging member clips 258 engage the cover engaging member rod 260 to secure the cover 252 in place on the frame 250. Note in particular that the clips 258, which are each a short section of angle iron, are located near the sides of the frame 250 such that the clips 258 prevent lateral movement of the cover 252 with respect to the frame 250. This is an important feature that thwarts attempts to pry the cover off of or away from the frame. The cover further includes a lock-bar hole (not visible) protected within a lock recess comprised of the cover plate 252 and a shroud 254. The general arrangement of the lock recess and shroud function was discussed hereinbefore. In operation and during installation, the technician installs the frame 250 and support members 264 into the enclosure 268. The jack-bolts 262 are tightened, and then the cover 252 is engaged with the frame 250. The lock bar 256 is presented within the lock recess, and the lock 266 is engaged with the lock interface. Finally, the original cover 272 is replaced on the enclosure 268.

Figure 20B:
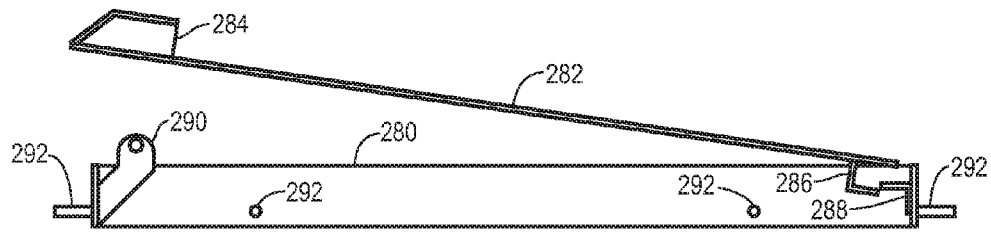
FIGS. 20A-C are top view and section view drawings of a security cover apparatus installed on an electrical junction box according to an illustrative embodiment of the present invention.
Figure 20A:
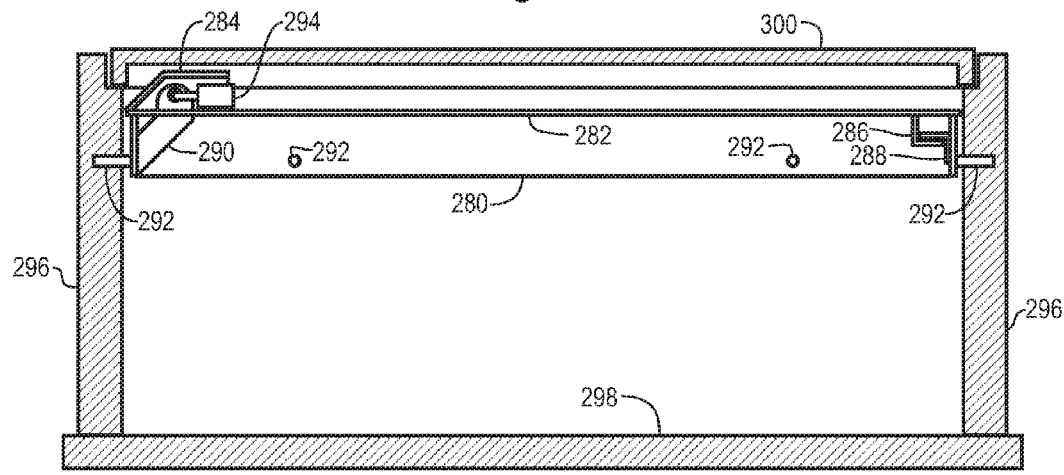
Figure 20C:
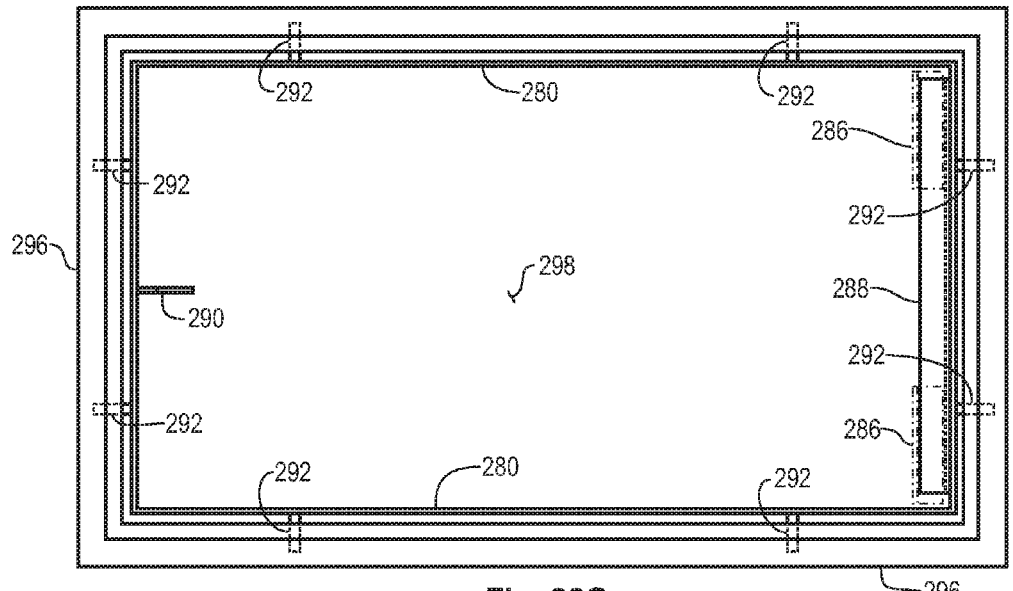

Reference is directed to FIGS. 20A-C, which are top view and section view drawings of a security cover apparatus installed on an electrical junction box according to an illustrative embodiment of the present invention. FIG. 20A is a side-looking cross section that includes the enclosure 296. FIG. 20B is a side-looking cross section of the cover 282 and frame 280, showing the cover 282 partially open. FIG. 20C is an downwardly-looking section view showing the top of the frame 280 and enclosure 296. The frame 280 is fabricated from steel and is sized to generally conform to the shape of the access opening in the enclosure 296, which is a ground-mounted concrete junction box in the illustrative embodiment. In the illustrative embodiment, the frame 280 is supported within the enclosure 296 by plural enclosure engaging members 292, which are rigid studs welded to the frame 292. Steel bolts are also suitable. The enclosure engaging means 292 are cast into the concrete sidewalls of the enclosure at the time it is fabricated, which thereby fixes the frame 280 at the desired position adjacent to the access opening of the enclosure 296.

The frame 280 has a lock-bar 290 welded to its interior surface that projects upwardly toward the exterior of the enclosure 296 and frame 280. The extended end of the lock-bar 290 has a lock-interface formed therein, which is a shackle hole in the illustrative embodiment. At the other end of the frame 290, there is a steel angle iron 288 welded to the frame, which serves as a cover-engaging member and half of a coupling hinge. The cover 282 is a steel plate sized to cover the frame 280, which also complies with the shape of the access opening in the enclosure 296. The underside of the cover has a pair of angle clips 286, which serves as frame engaging members and the other half of a hinge. As can be seen in FIG. 20B, the cover 282 is placed on top of the frame 280, and the frame engaging member clips 286 engage the cover engaging member clips 288 to secure the cover 282 in place on the frame 280. Note in particular that the clips 286, which are each a short section of angle iron, are located near the sides of the frame 280 such that the clips 286 prevent lateral movement of the cover 282 with respect to the frame 280. The cover further includes a lock-bar hole (not visible) protected within a lock recess comprised of the cover plate 282 and a shroud 284. The general arrangement of the lock recess and shroud function was discussed hereinbefore. In operation and during installation, the factory produces the enclosure 296 by casting concrete, which is cast with the frame 280 engaged by the plural studs 292. During installation, the cover 282 is engaged with the frame 280. The lock bar 290 is presented within the lock recess, and the lock 294 is engaged with the lock interface. Finally, the original cover 300 is replaced on the enclosure 296.

Figure 21:
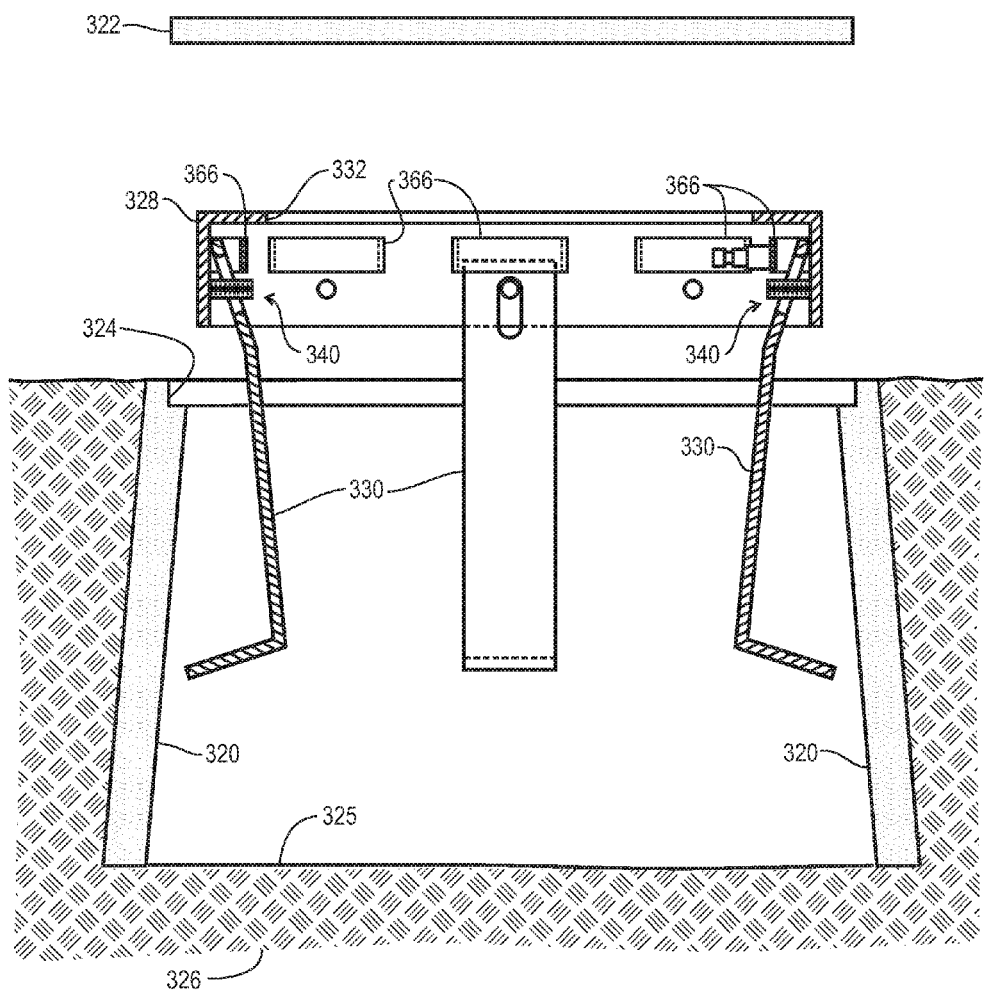
FIG. 21 is a cross section view of a ground box security cover according to an illustrative embodiment of the present invention.

Reference is directed to FIG. 21, which is a cross section view of a ground box security cover according to an illustrative embodiment of the present invention. The illustrative embodiment of FIG. 21 represents an alternative configuration to the embodiment of FIGS. 11 through 15 and FIGS. 19A through C. All of these embodiments provide teachings for securing the access opening of a ground box, typically an electric junction box in which circuits and wiring are accessible for installation and service. As in FIGS. 11 through 15, the illustrative embodiment of FIG. 21 accommodates the type of ground box that has sides and an exterior lid, but that is open to the earth on the bottom. Such ground boxes are widely used by utility providers, municipalities, and commercially. In FIG. 21, the box 320 has side walls that taper outwardly into the earth 326, with a floor 325 that is exposed bare earth. The technique for securing open bottom ground boxes in the embodiments of FIGS. 11-15 and FIG. 21 is to employ legs that engage the bottom of the box 320 side walls. When such an arrangement is employed, lifting of the cover results in a lifting of the entire box. However, the combination of the tapered walls, conduit connections, and in some installations, surface concrete flashing, makes such lifting effectively impossible.

In FIG. 21, the security apparatus is arranged for installation as follows. The exterior lid 322 of the ground box 320 is removed. The security cover apparatus is partially assembled and lowered into the ground box 320. The partial assembly consists of the frame 328 and plural legs 330, which are loosely connected to the frame 328 such that they clear the access opening 324 of the ground box 320. The frame 328 has an opening 332 for access into the ground box 320 once it is fully installed. The loose attachment 340 will be more fully described hereinafter, but generally allows the legs 330 to collapse inwardly so that the legs 330 clear the access opening 324 during insertion. Another feature of this embodiment is the use of leg guides 366 attached to the frame 328. The leg guides 366 aid the installation process by limiting lateral movement of the legs 330 when they are loosely connected 340 to the frame 328. This feature aids the guidance of the legs downwardly into the ground box 320 and also stabilizes the legs 330 as they are tapped under the sidewalls of the ground box 320.

Figure 22:
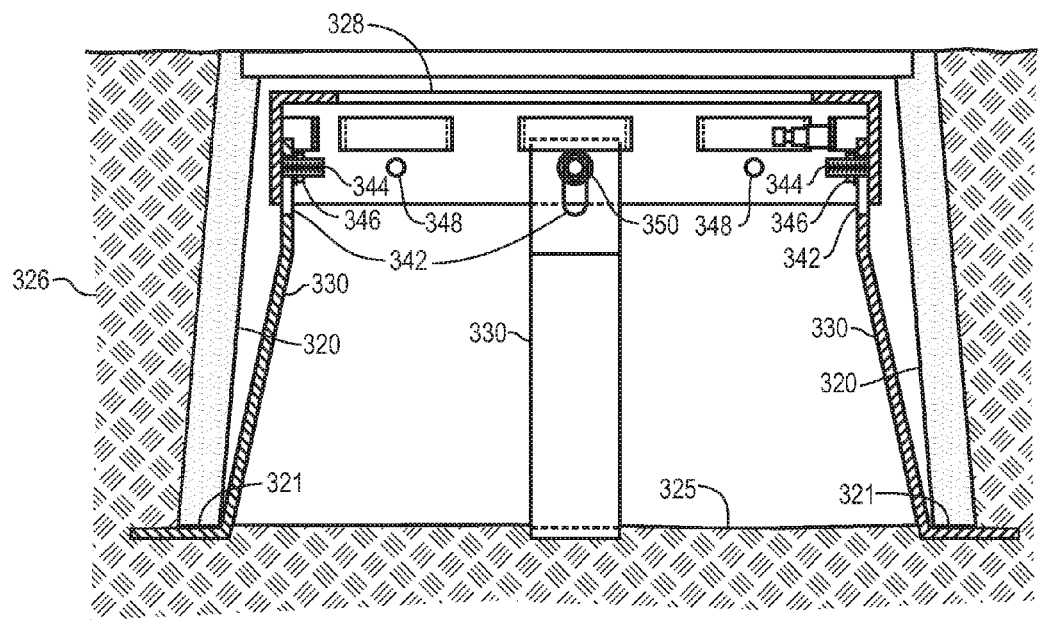
FIG. 22 is a cross section view of a ground box security cover according to an illustrative embodiment of the present invention.

Reference is directed to FIG. 22, which is a cross section view of the ground box security cover apparatus according to an illustrative embodiment of the present invention after the frame 328 and legs 330 have been fully installed into the ground box 320. Note that the legs 330 have been pushed under the bottom 321 side walls of the ground box 320 and into the earth floor 325. This can be accomplished by digging earth 326 away to provide clearance, or by tapping the legs 330 under the bottom 321 of the box 328 side walls using a hammer. Once the legs 330 are in place, the engagement between the legs 330 and the frame 328 is rigidly fixed by tightening the connection of plural frame mount means 324 to plural leg attachment means. In this embodiment, the frame mount means 342 are slotted holes in the legs 330, and the leg attachment means are threaded fasteners such as bolts 350 and threaded holes 348 or threaded studs 344 and nuts 346, as will be more fully discussed hereinafter.

Figure 23:
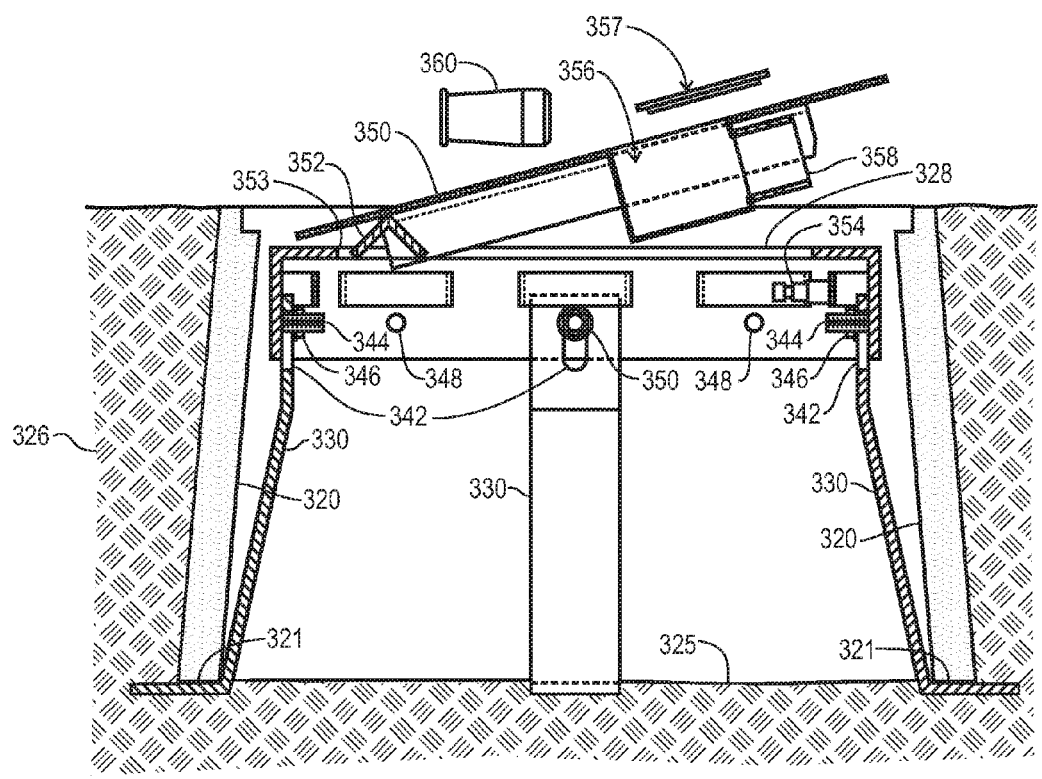
FIG. 23 is a cross section view of a ground box security cover according to an illustrative embodiment of the present invention.

Reference is directed to FIG. 23, which is a cross section view of the ground box 320 security cover apparatus according to an illustrative embodiment of the present invention. FIG. 23 illustrates the installation of a rigid cover 350 onto the frame 328, which has previously been fixed in position. The rigid cover 350 is a steel plate, such as a quarter inch steel plate, in the illustrative embodiment. The rigid cover 350 has a frame engaging means 352, which is an angle iron clip in the illustrative embodiment. The angle iron clip 352 is lowered onto the frame at an angle, as shown, and slid toward and edge 353 of the frame 328, which secures one side of the rigid cover 350 from removal from the frame 328. The rigid frame 328 also has a lock interface 354 rigidly affixed to it, and the lock interface 354 is a lock receiver in the illustrative embodiment. The rigid cover 350 has a lock recess 356 built on its lower surface, which continues to a lock shroud 358. A cylinder lock 360 is inserted into the lock recess 356 and forward into the lock shroud 358 to engage the lock receiver 354 and secure the rigid cover 350 on the frame 328. The locking arrangement will be more fully described hereinafter. Note that there is also a snap-in weather cover 357 used to seal the lock recess 356 after the rigid cover 328 is locked into place.

Figure 24:
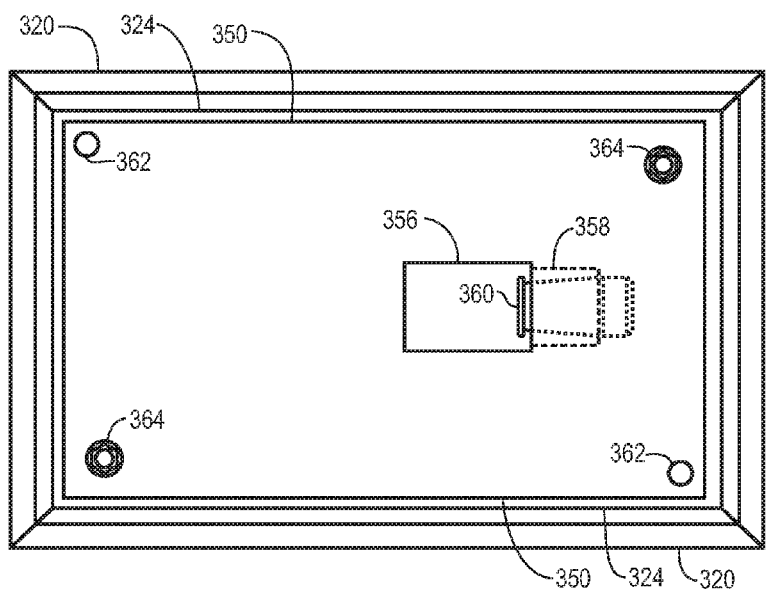
FIG. 24 is a top view of a ground box security cover according to an illustrative embodiment of the present invention.

Reference is directed to FIG. 24, which is a top view of the ground box security cover according to an illustrative embodiment of the present invention. This figure illustrates the arrangement of the rigid cover 350 in place within the access opening 324 of the ground box 320 from above. Note that a pair holes and fasteners 364 are used to fix the rigid cover 350 to the frame (not shown) in addition to the locking features of the illustrative embodiment. In addition, there is a pair of mounting holes 362 used to bolt the exterior lid (not shown) of the ground box 320 to the rigid cover 350. In this figure, the lock recess 356 is illustrated, as well as the cylinder lock 360 inserted into the lock shroud 358.

Figure 25:
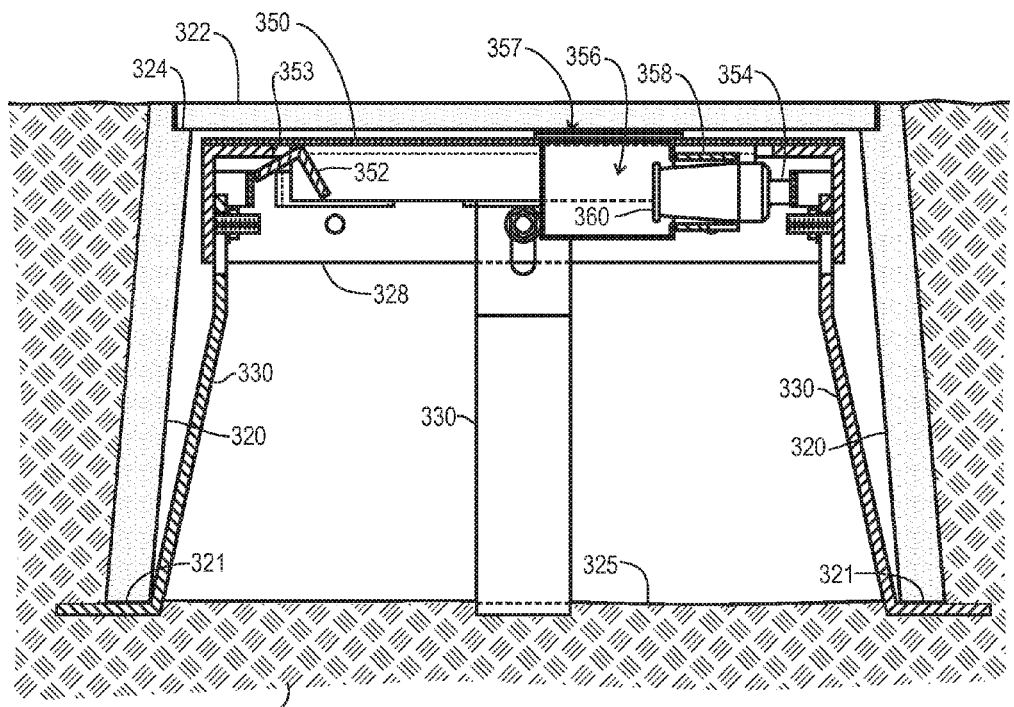
FIG. 25 is a cross section view of a ground box security cover according to an illustrative embodiment of the present invention.

Reference is directed to FIG. 25, which is a cross section view of the ground box 320 security cover according to an illustrative embodiment of the present invention. This figure shows the rigid cover 350 and exterior lid 322 in place after the ground box 320 has been fully secured. Note that the frame engaging member 352 engages the frame 328 along edge 353 of the frame opening (detailed hereinafter). The lock 360 engages the lock receiver 354 and is inserted into the lock shroud 358. The cylinder lock 360 outside diameter is slightly less than the inside diameter of the lock shroud 358. Since the lock is locked to the lock receiver 354 it cannot be removed without unlocking the lock 360. Thus the lock shroud 358, which is fixed to the rigid cover 350, cannot move upwardly and secures the rigid cover 350 in place. The lock recess 356 provided clearance for inserting and removing the lock 360, as well as an access space for operating the lock key or combination dial. The weather cover 357 keep water and debris out of the lock recess 356. The contents of the ground box 320 are thusly secured.

Figure 26:
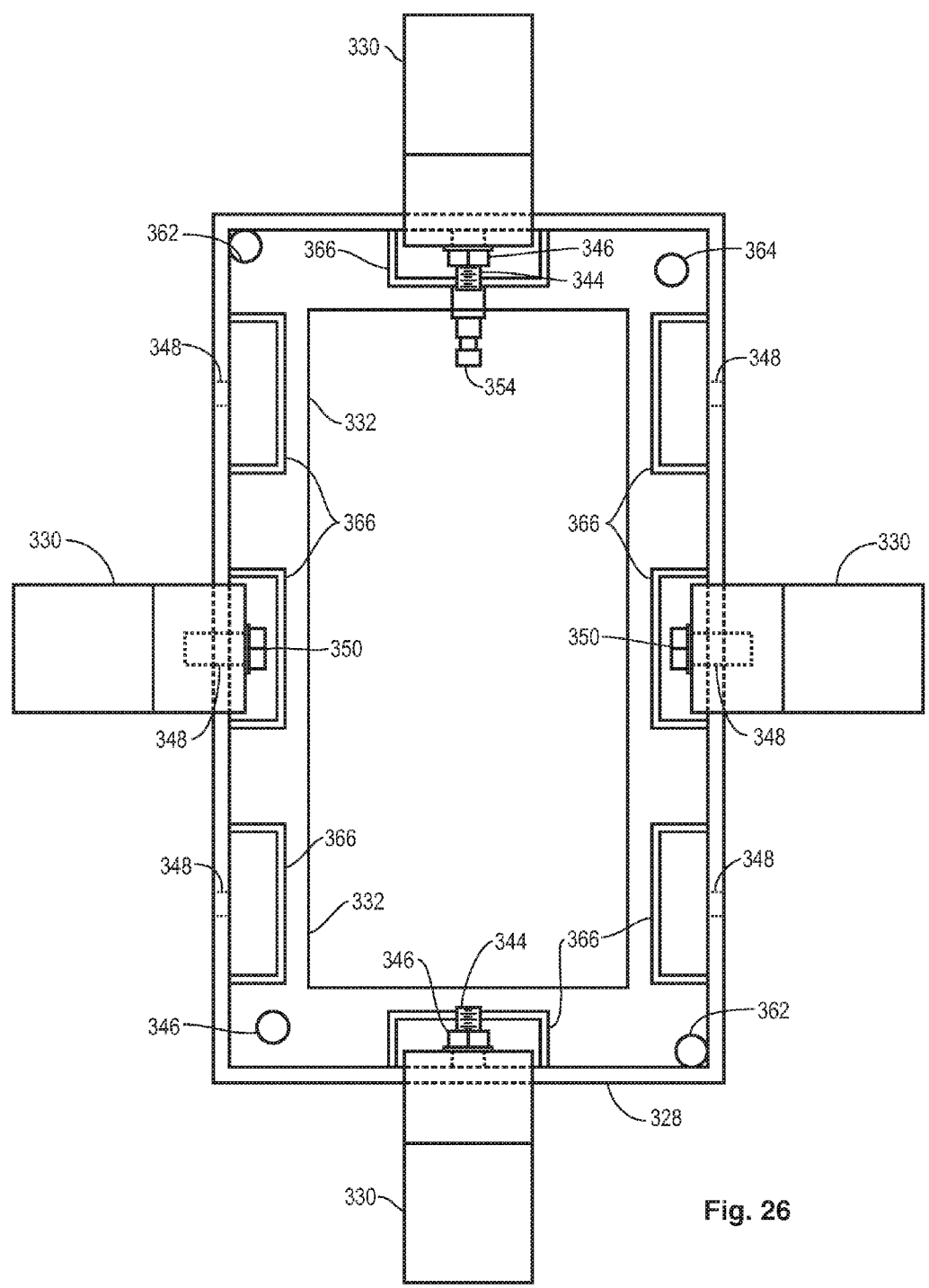
FIG. 26 is a bottom view drawing of a rigid frame with legs attached according to an illustrative embodiment of the present invention.

Reference is directed to FIG. 26, which is a bottom view drawing of the frame 328 with legs 330 attached according to an illustrative embodiment of the present invention. The frame 330 in the illustrative embodiment is fabrication from one-quarter inch mild steel angle iron and sized to accommodate the size of the access opening in the ground box (not shown). The frame 328 is welded into a rectangle, with a frame opening 332 defined by the arrangement and size of the steel angle iron. Plural leg guides 366 are welded to the frame 328 around its interior perimeter. The leg guides 366 are sized to loosely fit the leg 330 cross section. These guides 330 prevent the legs from wobbling too freely while the combination is inserted into the ground box (not shown). During installation, the location of the legs 330 is selected to accommodate whatever interfering objects might be inside the ground box (not shown). Along the long sides of the frame 328 are drilled and tapped holes 348. These are used as the leg attachment means in combination with threaded bolts 350 inserted through the frame mount means on each respective leg, which is a slotted hole in the illustrative embodiment. On the short sides of the frame 328, the leg attachment means are threaded studs 344 welded to the interior surface of the frame 328. Connection to the legs 330 is accomplished using a nut 346. Note that the lock receiver 354 is welded to the inner surface of one of the leg guides, but could readily be attached to the frame at some other location. The lock receiver 354 and lock (not shown) in the illustrative embodiment are the type used to lock the cross pin in a Class III vehicular receiver hitch, and this choice is made due to cost considerations. Various other locks and lock interfaces could be employed. The frame 328 to rigid cover mounting holes 364 and the cover to exterior lid mounting holes 362 are also visible in this drawing figure.

Figure 27B:
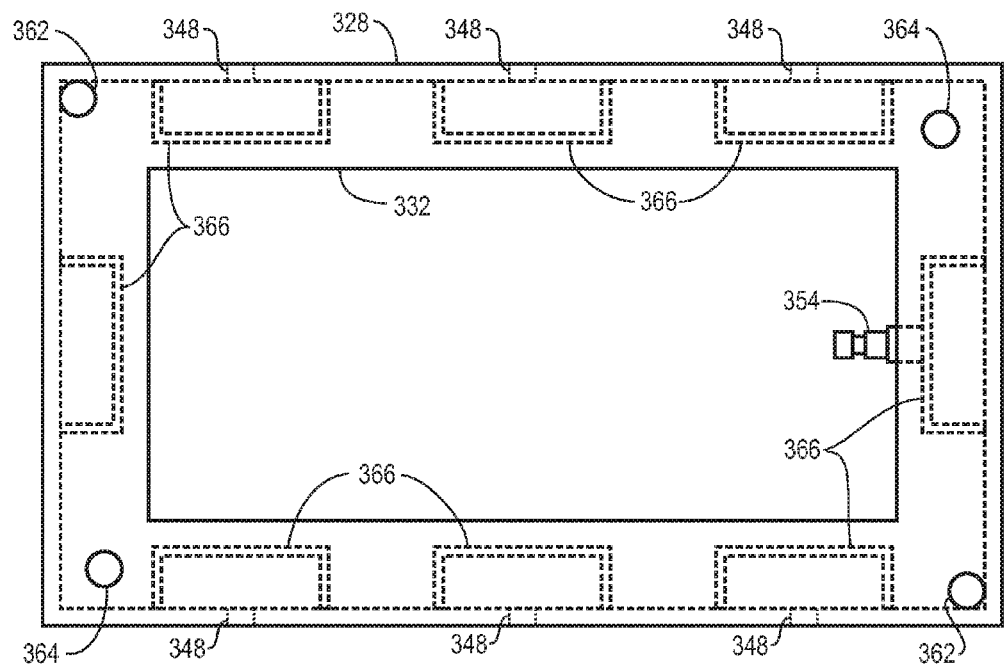
FIGS. 27A and 27B are section view and top view drawings, respectively, of a rigid frame according to an illustrative embodiment of the present invention.
Figure 27A:
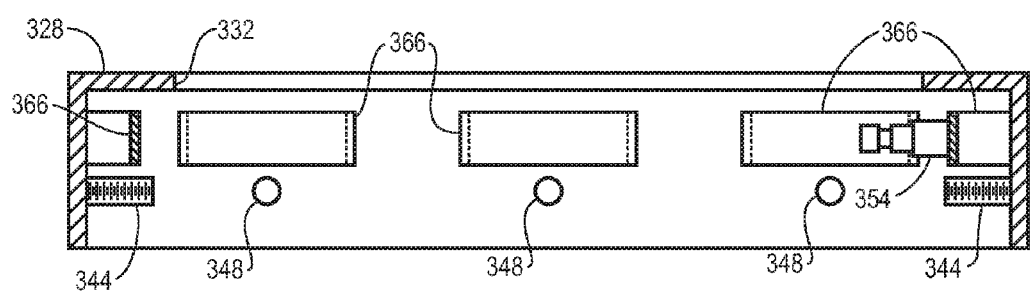

Reference is directed to FIGS. 27A and 27B, which are section view and top view drawings, respectively, of the rigid frame according to an illustrative embodiment of the present invention. With respect to FIG. 27B, all of these component parts were discussed with respect to FIG. 26, and need not be repeated here. Note, however, that the frame opening 332 is most clearly illustrated in this drawing FIG. 27B. With respect to FIG. 27A, the arrangement between the leg guides 366 and the leg attachment means 344, 348 is more plainly presented. Note the welded studs 344 and the tapped holes 348 align with the center of each leg guide 366, and are located below. This arrangement facilitates the attachment of the legs (not shown), and the vertical adjustment of the slotted holes (not shown) in those legs. Also, note that the lock receiver 354 is welded to one of the leg guides 366.

Figure 28C:
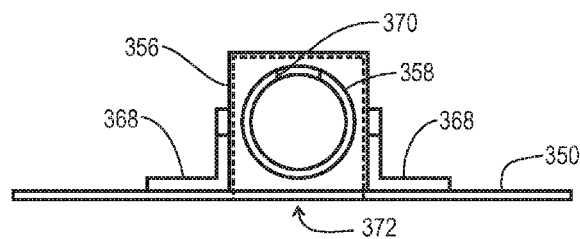
FIGS. 28A, 28B, and 28C are bottom view, section view and end view drawings, respectively, of a rigid cover according to an illustrative embodiment of the present invention.
Figure 28A:
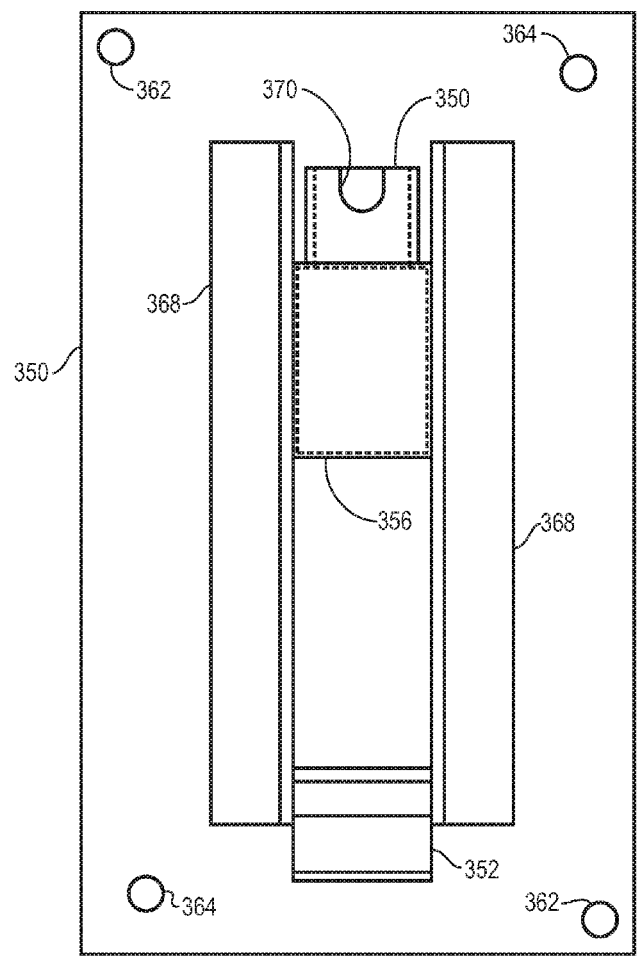
Figure 28B:
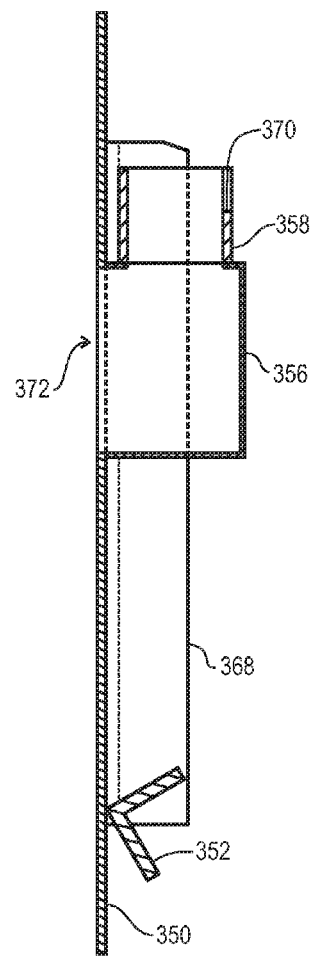

Reference is directed to FIGS. 28A, 28B, and 28C, which are bottom view, section view and end view drawings, respectively, of the rigid cover 350 according to an illustrative embodiment of the present invention. The cover 350 is fabricated from eight inch mild steel in the illustrative embodiment. It is reinforced with a pair of three-sixteenth angle irons 368, which also provide the attachment structure for the frame engagement member 352 and the lock recess 356. The frame engagement member 352 is also a mild steel angle iron. The lock recess 356 is a box structure fabricated from eighth-inch steel with a an opening 372 that also passes through the rigid cover 350 to enable insertion of the lock (not shown) therethrough. The lock recess box 356 is also open to, and continues into a lock shroud 350 portion that is fabricated from three-sixteenth steel tube, which is open at both ends. One end accommodates the lock (not shown) and the other end accommodates the lock receiver (not shown). If needed, a receiver clearance slot 370 can be provided through the side of the lock shroud 350 to provide clearance for when the cover is attached to the frame. The frame 328 to rigid cover mounting holes 364 and the cover to exterior lid mounting holes 362 are also visible in this drawing figure.

Figure 29C:
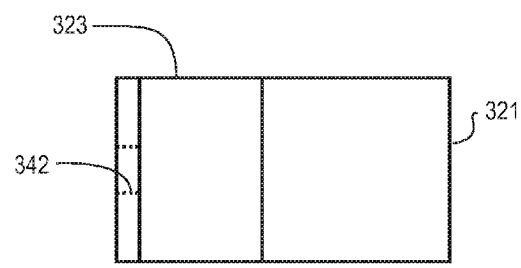
FIGS. 29A, 29B, and 29C are side view, end view, and top view drawings, respectively, of a leg according to an illustrative embodiment of the present invention.
Figure 29B:
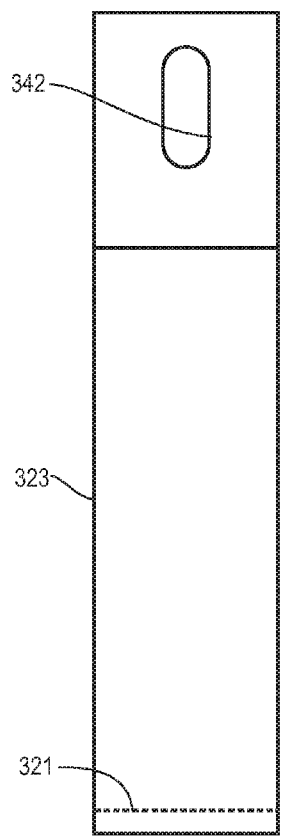
Figure 29A:
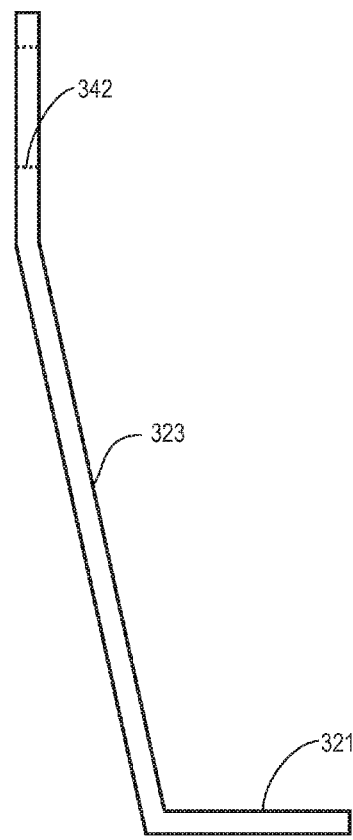

Reference is directed to FIGS. 29A, 29B, and 29C, which are side view, end view, and top view drawings, respectively, of a leg according to an illustrative embodiment of the present invention. The leg in the illustrative embodiment is fabricated from quarter-inch mild steel plate and formed into shape. The leg 330 comprises a vertical portion 323 and a base flange portion 321. The base portion is positioned under the side wall of the ground box (not shown). The upper end of the vertical portion has a frame mount means 342, which is a slotted hole in the illustrative embodiment. The hole 342 is slotted to allow for adjustment of the vertical position of the frame (not shown) during installation.

Figure 30:
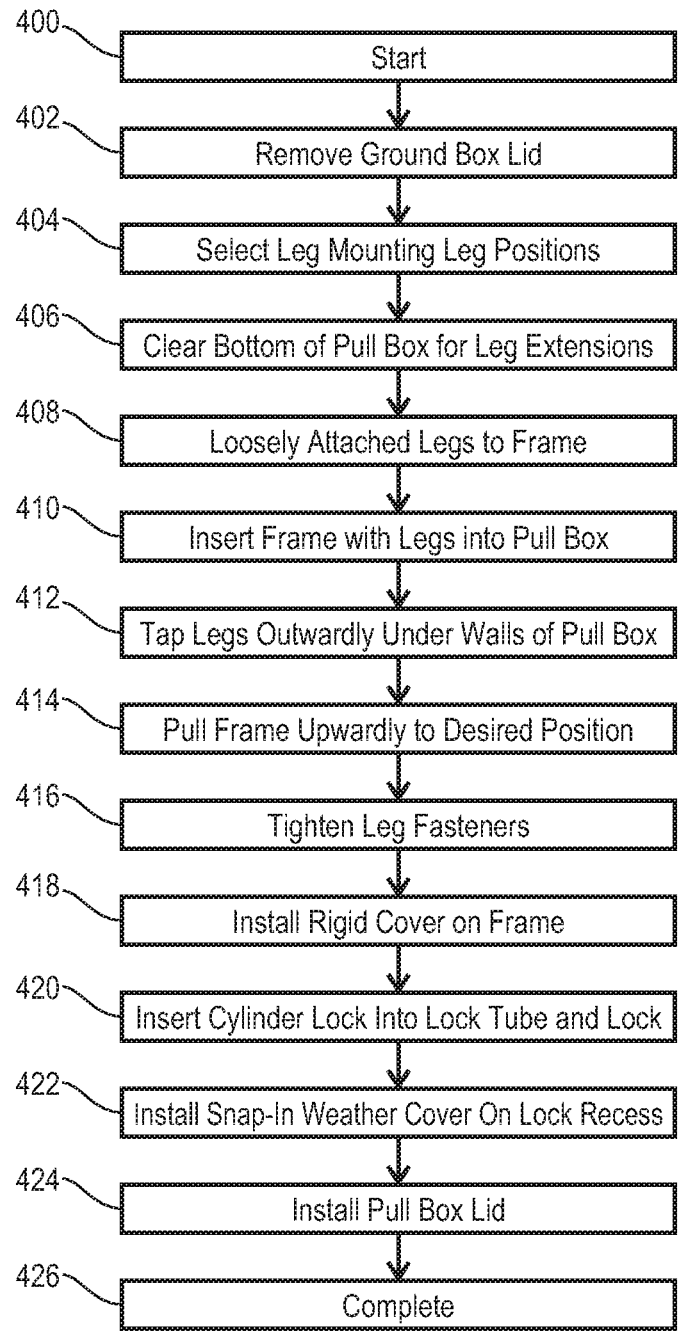
FIG. 30 is a installation process flow diagram according to an illustrative embodiment of the present invention.

Reference is directed to FIG. 30, which is an installation process flow diagram according to an illustrative embodiment of the present invention. The method of installing the security cover apparatus to an open bottom ground box is now presented. The process starts at step 400 and proceeds to step 402 where the existing ground box lid is removed. At step 404, the installer inspects the box and selects which of the plural leg mounting position would accommodate the interior of the particular ground box. At step 406, the bottom area of the ground box is cleared for insertion of the leg base flange extensions. At step 408, the legs are loosely attached to the frame to enable clearance through the ground box access opening. At step 410 the frame and legs are inserted into the ground box. At step 412, the legs a tapped under the side wall of the ground box. At step 414, the frame is lifted to the desire position with respect to the access opening in the ground box. At step 416 the fasteners are tightened to form a rigid structure. At step 418 the rigid security cover is attached to the frame. At step 420, the cylinder lock is inserted into the lock recess and advanced into the lock shroud to engage the lock receiver. At step 422, the weather cap is snapped into position over the lock recess opening. At step 424, the pull box lid is attached to the rigid cover, completing the installation process at step 426.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A security cover apparatus, which is securable using a lock, for an access opening in a ground box that has side walls and a bottom that opens to the earth, comprising:
a frame that substantially conforms to the shape of the access opening in the ground box, said frame having a frame opening for access to the interior of the ground box, said frame having a lock receiver fixed thereto, and said frame having a first leg attachment means disposed thereon;
a first leg for supporting said frame at a position fixed with respect to the access opening, said leg having a base flange at a lower end for engaging the bottom of the ground box side walls, and said leg having a frame mount means adapted to engage said leg attachment means, and wherein said frame mount means and said leg attachment means can be selectively engaged to either a flexible connection suitable for insertion of said frame and said first leg into the ground box as a unit, and a fixed connection wherein said frame is fixed in location with respect to the access opening while said base flange engages the bottom of the side walls;
a rigid cover configured to substantially cover said frame opening, and having a frame engaging member fixed thereto for removeably engaging said frame and retaining said rigid cover to said frame;
a lock recess formed into said rigid cover and having a lock insertion port though said rigid cover, said lock recess continuing into a lock shroud that aligns with said lock receiver when said rigid cover is disposed on said frame opening, and wherein
said lock receiver is accessible through said lock shroud while said rigid cover is engaged with said frame, and wherein said lock can be inserted through said lock recess and said lock shroud to engaged said lock receiver such that the lock interferes with movement of said lock shroud to prevent removal of said rigid cover from said frame, and thereby secures the interior of the ground box.

2. The apparatus of claim 1, further comprising:
a first leg guide fixed to said frame and aligned to limit lateral movement between said first leg and said frame.

3. The apparatus of claim 1 wherein the lock is a cylinder lock with an outside diameter, and wherein:
said lock shroud is tubular, having in inside diameter slightly larger than the outside diameter of the lock.

4. The apparatus of claim 1, and wherein:
said leg engagement means is a threaded fastener which engages said rigid frame and said frame mount means is a hole formed through said first leg.

5. The apparatus of claim 4, and wherein:
said threaded fastener is selected from a bolt that engages a threaded hole in said frame, and a threaded stud welded to said frame that is used in combination with a nut.

6. The apparatus of claim 1, and wherein:
said frame engaging member is an angle iron clip fixed to said rigid cover that engages an edge of said frame opening.

7. The apparatus of claim 1, further comprising:
plural legs with corresponding frame mount means, and wherein
said frame comprises plural leg attachment means.

8. The apparatus of claim 7, and wherein:
the number of said plural leg attachment means exceeds the number of said plural legs, and wherein
mounting locations of said plural legs amongst said plural leg attachment means is optionally selectable to accommodate the interior of the ground box.

9. The apparatus of claim 1 wherein the ground box includes an exterior lid, and wherein:
said rigid cover further includes an exterior lid fastening means disposed thereon for access from the exterior surface thereof, for engaging at least a first fastener for retaining the exterior lid about said exterior surface of said rigid cover.

10. A method of selectively securing, against theft, the contents of a ground box that has an access opening, side walls and a bottom that opens to the earth by using a lock and a security cover apparatus that consists of a frame, plural legs, and a rigid cover, the method comprising the steps of:
loosely attaching the plural legs to the frame by aligning a frame mount on each of the plural legs with a corresponding leg attachment means on the frame;
inserting the frame and plural legs into the ground box through the access opening and positioning the frame with respect to the access opening;
inserting a base flange on each of the plural legs under the bottom of the ground box side walls;
tightening the attachment between the plural leg attachment means and the plural frame mounts, thereby forming a rigid structure between the plural legs and the frame;
installing the rigid cover onto a frame opening in the frame by engaging a frame engagement means on the rigid cover with the frame and aligning a lock shroud portion of the rigid cover with a lock receiver fixed to the frame, thereby substantially covering the frame opening, and partially engaging the rigid cover with the frame;

inserting the lock through a lock insertion port on the exterior of the rigid cover and into a lock recess formed into the rigid cover, and advancing the lock into the lock shroud and engaging the lock receiver, thereby positioning the lock to interfere with movement of the lock shroud and preventing removal of the rigid cover from the frame, and thereby securing the interior of the ground box.

11. The method of claim 10, and wherein:

said loosely attaching the plural legs steps further includes engaging the plural legs into plural respective leg guides fixed to the frame, thereby limiting lateral movement between the plural legs and the frame.

12. The method of claim 10 wherein the lock is a cylinder lock with an outside diameter, and wherein the lock shroud is tubular, having an inside diameter slightly larger than the outside diameter of the lock.

13. The method of claim 10, and wherein the leg engagement means is a threaded fastener which engages the rigid frame and the frame mount means is a hole formed through said first leg, and wherein:

said tightening step is accomplished by rotating the threaded fastener.

14. The method of claim 13, and wherein the threaded fastener is selected from a bolt that engages a threaded hole in the frame, and a threaded stud welded to the frame that is used in combination with a nut, and wherein:

said tightening step may be accomplished by rotating the nut.

15. The method of claim 10, and wherein the frame engaging member is an angle iron clip fixed to the rigid cover, and wherein:

said installing the rigid cover step further includes engaging the angle iron clip with an edge of the frame opening.

16. The method of claim 10, and wherein the number of plural leg attachment means exceeds the number of said plural legs, and further comprising the step of:

selecting a subset of the plural leg attachment means to accommodate the interior of the ground box.

17. The method of claim 10 wherein the ground box includes an exterior lid, and further comprising the steps of:

placing the exterior lid on the ground box, and engaging at least a first fastener between the exterior lid and an exterior lid fastening means disposed on the rigid cover, thereby securing the exterior lid in place.

18. The method of claim 10, further comprising the step of:

attaching a weather cover to the lock insertion port.

* * * * *